US011981543B2

(12) United States Patent
Karlsson et al.

(10) Patent No.: US 11,981,543 B2
(45) Date of Patent: May 14, 2024

(54) SPREADER FOR LIFTING INTERMODAL CONTAINER

(71) Applicant: ELME SPREADER AB, Älmhult (SE)

(72) Inventors: Gösta Karlsson, Killeberg (SE); Erik Förander, Virestad (SE); Örjan Karlsson, Lund (SE)

(73) Assignee: ELME SPREADER AB (CH)

( * ) Notice: Subject to any disclaimer, the term of this patent is extended or adjusted under 35 U.S.C. 154(b) by 0 days.

(21) Appl. No.: 17/954,853

(22) Filed: Sep. 28, 2022

(65) Prior Publication Data

US 2023/0027301 A1 Jan. 26, 2023

Related U.S. Application Data

(63) Continuation of application No. 17/209,610, filed on Mar. 23, 2021, now Pat. No. 11,492,234, which is a (Continued)

(51) Int. Cl.
*B66C 1/66* (2006.01)
*B66C 1/10* (2006.01)

(Continued)

(52) U.S. Cl.
CPC .............. *B66C 1/663* (2013.01); *B66C 1/101* (2013.01); *B66C 1/66* (2013.01); *B66C 6/00* (2013.01);

(Continued)

(58) Field of Classification Search
CPC .......... B66C 1/663; B66C 1/101; B66C 1/66; B66C 1/00; B66C 13/12; B66C 13/14

(Continued)

(56) References Cited

U.S. PATENT DOCUMENTS 3,713,556 A * 1/1973 Tredray .................. B66F 9/186
294/81.21
3,788,680 A 1/1974 Brown (Continued)

FOREIGN PATENT DOCUMENTS

CN 202414949 U 9/2012
CN 102791607 A 11/2012

(Continued)

OTHER PUBLICATIONS

Chinese Search Report, Chinese Application No. 2021105520572, Dated Jun. 20, 2023.

(Continued)

*Primary Examiner* — Paul T Chin
(74) *Attorney, Agent, or Firm* — Condo Roccia Koptiw LLP

(57) ABSTRACT

A spreader for lifting an intermodal transport container includes a main beam extending in a longitudinal direction, the main beam formed of a first, upper C-beam of a relatively thicker material thickness and a second, lower C-beam of a relatively thinner material thickness; and an indicator configured to provide an indication if a distance in a transversal direction between a pair of twist-locks is set in a wide-body position when lowered onto respective lifting castings provided with top openings separated by a transversal distance corresponding to a standard position.

8 Claims, 9 Drawing Sheets

Related U.S. Application Data continuation of application No. 16/071,482, filed as application No. PCT/SE2016/050070 on Feb. 1, 2016, now Pat. No. 10,968,081.

(51) Int. Cl.

| | |
|---|---|
| ***B66C 6/00*** | (2006.01) |
| ***B66C 13/12*** | (2006.01) |
| ***B66C 13/14*** | (2006.01) |
| ***B66C 13/46*** | (2006.01) |

(52) U.S. Cl.
CPC .............. *B66C 13/12* (2013.01); *B66C 13/14* (2013.01); *B66C 13/46* (2013.01)

(58) Field of Classification Search
USPC .................................. 294/81.1, 81.21, 81.53
See application file for complete search history.

(56) References Cited

U.S. PATENT DOCUMENTS

| | | | | |
|---|---|---|---|---|
| 3,874,719 | A | 4/1975 | Goyarts | |
| 3,992,050 | A | 11/1976 | Backteman | |
| 4,093,090 | A * | 6/1978 | Whiteman | B66F 9/186 294/81.4 |
| 4,245,271 | A | 1/1981 | Gwin | |
| 4,358,145 | A | 11/1982 | Svensson | |
| 4,462,627 | A | 7/1984 | Kudlicka | |
| 4,795,203 | A | 1/1989 | Karlsson | |
| 5,052,734 | A | 10/1991 | Hasegawa et al. | |
| 5,114,295 | A | 5/1992 | Jansson | |
| 5,280,980 | A * | 1/1994 | Coatta | B66C 1/102 294/81.1 |
| 5,522,633 | A * | 6/1996 | Massi | B66C 1/16 294/67.32 |
| 5,630,636 | A | 5/1997 | Karlsson | |
| 5,769,589 | A | 6/1998 | Lubbers | |
| 5,806,701 | A | 9/1998 | Bae | |
| 6,991,274 | B2 * | 1/2006 | Brooks | B66C 1/66 294/81.61 |
| 7,128,353 | B2 | 10/2006 | Jussila et al. | |
| 7,152,895 | B1 * | 12/2006 | Jussila | B66C 1/663 294/81.53 |
| 7,240,936 | B2 | 7/2007 | Petzitillo, Jr. et al. | |
| 7,665,784 | B2 | 2/2010 | Stinis | |
| 7,686,363 | B2 | 3/2010 | Karlsson | |
| 8,177,463 | B2 | 5/2012 | Walker | |
| 8,251,417 | B2 * | 8/2012 | Mills | B66C 1/102 294/81.1 |
| 8,480,349 | B2 | 7/2013 | Hiltscher | |
| 8,585,108 | B2 | 11/2013 | Karlsson | |
| 8,840,159 | B2 | 9/2014 | Karlsson | |
| 10,280,055 | B2 * | 5/2019 | Menduni | B66F 9/18 |
| 10,968,081 | B2 | 4/2021 | Karlsson et al. | |
| 11,167,960 | B2 * | 11/2021 | Zhang | B66C 1/101 |
| 2003/0168289 | A1 | 9/2003 | Faller | |
| 2008/0292440 | A1 | 11/2008 | Hiltscher | |
| 2009/0015025 | A1 | 1/2009 | Karlsson | |

FOREIGN PATENT DOCUMENTS

| | | | |
|---|---|---|---|
| DE | 3010666 | A1 | 9/1981 |
| DE | 3543951 | A1 | 6/1987 |
| DE | 102012010248 | A1 | 11/2013 |
| GB | 2308564 | A | 7/1997 |
| JP | 2005112514 | A | 4/2005 |
| NL | 9400611 | A | 12/1995 |
| WO | 8103323 | A1 | 11/1981 |
| WO | 02060614 | A1 | 8/2002 |
| WO | 2011093768 | A1 | 8/2011 |
| WO | 2013060778 | A1 | 5/2013 |

OTHER PUBLICATIONS

European Search Report for EP Application No./Patent No. 23180508.6-1017/425368, Dated Sep. 28, 2023.

* cited by examiner

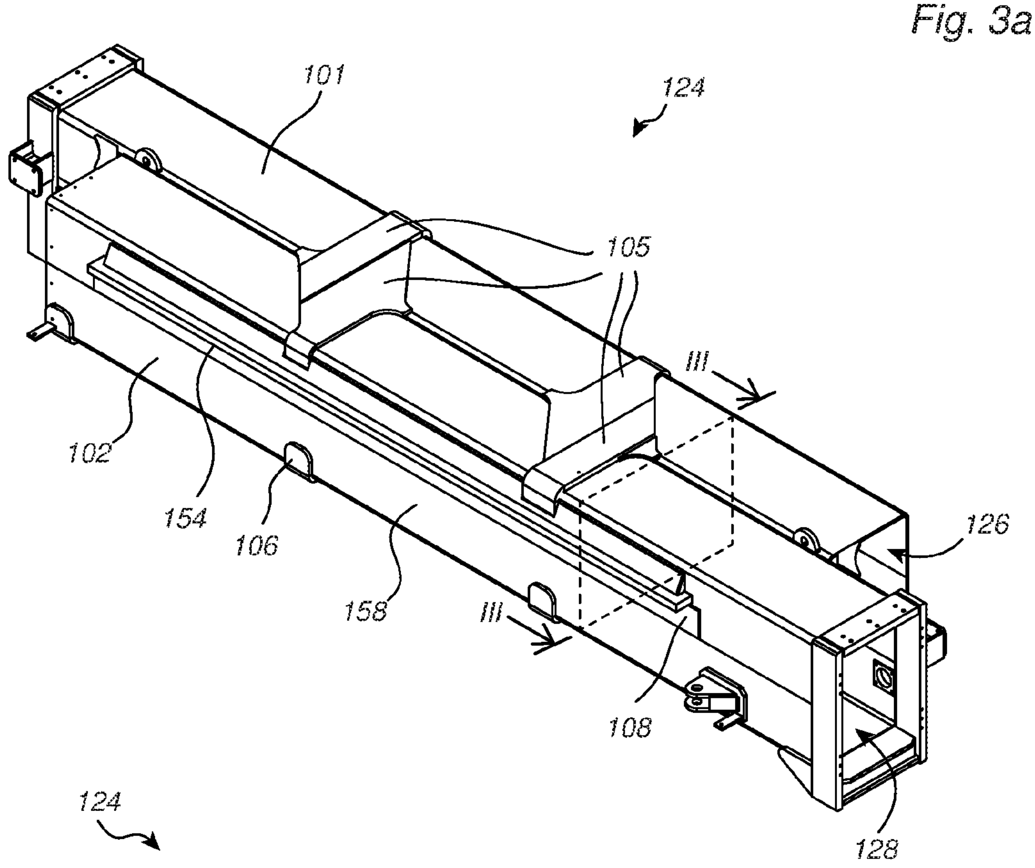
Fig. 3a
Fig. 3b
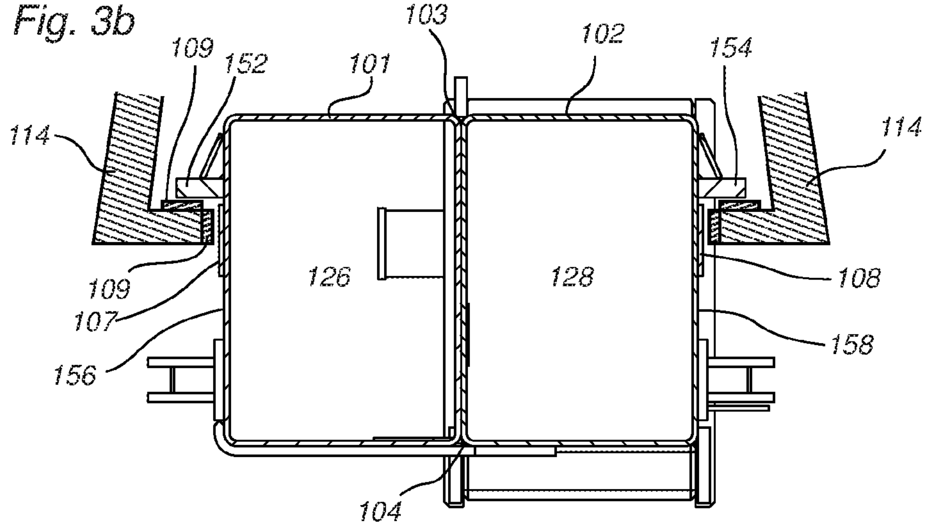

SPREADER FOR LIFTING INTERMODAL CONTAINER

CROSS REFERENCE TO RELATED APPLICATIONS

This application is a continuation of U.S. patent application Ser. No. 17/209,610, filed Mar. 23, 2021, which is a continuation of U.S. patent application Ser. No. 16/071,482, filed Jul. 19, 2018, now U.S. Pat. No. 10,968,081, issued Apr. 6, 2021, which is the National Stage Entry under 35 U.S.C. § 371 of Patent Cooperation Treaty Application No. PCT/SE2016/050070, filed Feb. 1, 2016, the contents of each of which are hereby incorporated by reference herein.

FIELD OF INVENTION

The present invention relates to a spreader for lifting an intermodal transport container. The invention also relates to a method of manufacturing such a spreader.

BACKGROUND OF THE INVENTION

WO2011093768A1 discloses an exemplary spreader for lifting intermodal containers. An intermodal container is a standardized shipping container which can be used across and transferred between different modes of transport, such as rail, truck and ship, without unloading and reloading the cargo inside the container.

Containers and other types of rigid load carriers of different standard dimensions are normally handled with the aid of a container spreader or yoke, which may typically be carried by a truck or a crane. The spreader attaches to a container at lifting castings, which are often called corner castings as they are typically arranged in all corners of a standard 20- or 40-foot container. For the purpose, the spreader is provided with a plurality of twist-locks, which are known in the art. Often, the spreader is telescopic so as to allow changing the distance between twist-locks along a longitudinal axis of the container, in order to accommodate for containers of different standard lengths. Containers having lengths other than 20 or 40 feet, such as 45-, 48- and 53-foot containers, often have a set of lifting castings separated by a standardized distance corresponding to the corner castings of a 20- or 40-foot container. Standards for intermodal containers are specified by the International Organization for Standardization, ISO, e.g. in the standards ISO 668:2013 and ISO 1496-1:2013.

It will be understood that container spreaders are used for handling large and heavy loads, and are exposed to high levels of stress. Such stress may lead to material fatigue, and if overweight containers are handled or service intervals are not respected, even fractures in critical components of the spreader. Needless to say, a container dropped to the ground may cause substantial damage. Hence, there is an incessant strive to increase the safety and reliability of container handling. At the same time, there are also other requirements that need to be met by a spreader. By way of example, it should be possible to produce and operate at a reasonable cost, and it should be easy and convenient to operate.

SUMMARY OF THE INVENTION

It is an object of the present invention to solve, or at least mitigate, parts or all of the above mentioned problems. To this end there is, according to a first concept, provided a spreader for lifting an intermodal transport container, the spreader comprising a main frame comprising a first travelling beam guide and, adjacent to said first travelling beam guide, a second travelling beam guide; a first travelling beam having a proximal end guided in said first travelling beam guide so as to allow movement along a first guide axis, and a distal end connected to a first twist-lock arrangement; and a second travelling beam having a proximal end guided in said second travelling beam guide so as to allow movement along a second guide axis parallel to the first guide axis, and a distal end connected to a second twist-lock arrangement, wherein the distal ends of said travelling beams are configured to variably extend from the respective travelling beam guides in opposite directions, so as to allow changing the axial distance between said first and second twist-lock arrangements to accommodate for containers of different axial lengths. The main frame comprises a main beam formed of a first, upper C-beam of a relatively thicker material thickness, said upper C-beam being oriented so as to define a downwards-facing channel; and a second, lower C-beam of a relatively thinner material thickness, said lower C-beam being oriented so as to define an upwards-facing channel, said upper and lower C-beams facing each other to define an inner space comprising said upper and lower channels. Using such a design, the material thickness of the upper portion of the main beam can be increased without increasing the total weight of the main beam. Such a spreader can thereby be made with fewer, or completely without, transversal reinforcement bands welded across the top surface of the main beam at predefined stop positions, associated with e.g. 20- and 40-foot containers, of the travelling beams' proximal ends. The main beam will thereby be relatively free from transversal welds, which would otherwise define transversal lines of weakness across the top of the beam—lines of weakness that could potentially allow the formation of cracks, and that would require the transversal reinforcement bands to have a substantial material thickness to compensate for the loss of strength due to the welds. Using a main beam as defined above, the overall weight of the main beam can be significantly reduced, with maintained or increased strength. Moreover, any vertical separation wall between the travelling beam guides can be made substantially thinner, or even removed, compared to the double wall resulting from welding a pair of hollow structural section, HSS, beams together. By way of example, a main frame for laden containers can be made more than 1000 kg lighter, which also allows for reducing the dimensions and weight of any suspension element, such as a rotator, between the spreader and e.g. a reach stacker truck. The total weight reduction, which may amount to more than 1500 kg, translates to a lower production cost of the spreader as well as significantly reduced tyre wear on any truck carrying the spreader. Preferably, the upper and lower C-beams are made of steel plate. A preferred steel plate thickness of the upper C-beam is between 15 mm and 25 mm, and more preferred, between 18 mm and 23 mm. A preferred steel plate thickness of the lower C-beam is between 8 mm and 11 mm.

According to an embodiment, the spreader further comprises a vertical separation wall dividing said inner space into said first and second travelling beam guides. Such a wall may be made using one layer of steel plate or steel sheet only, and using e.g. steel plate of a relatively thin material thickness, allowing its weight to be kept low. It also does not need to be uninterrupted along the length of the main beam, which also allows keeping its weight low. The separation wall may be welded to the inner faces of the upper and lower C-beams, thereby adding to the strength and stability of the main beam.

According to an embodiment, the first and second twist-lock arrangements are movable between a 20-foot position, in which the axial distance between the first and second twist-lock arrangements is adapted for engaging with the corner castings of a 20-foot ISO container, and a 40-foot position, in which the axial distance between the first and second twist-lock arrangements is adapted for engaging with the corner castings of a 40-foot ISO container. "20-foot" and "40-foot" refer to the established nomenclature of standardized containers; the ISO-standard distance between the twist-locks is somewhat shorter, since the twist-locks engage with openings in the containers' corner castings. The corresponding preferred longitudinal center-to-center distances between the twist-locks are about 5853 mm for 20-foot containers and about 11985 mm for 40-foot containers, respectively. Any references to feet or inches within this disclosure should be construed as references to established standard dimensions, rather than to the distances as such. This is also the reason why this disclosure does not consistently use the metric system for such dimensions.

According to an embodiment, said upper and lower C-beams are welded together along a pair of longitudinal welds. For maximum strength, said upper and lower beams are preferably welded directly to each other along said longitudinal welds, without any intermediate component between them.

According to an embodiment, the vertical height of the upper C-beam is lower than the vertical height of the lower C-beam. Such a configuration provides for a low weight of the main beam.

According to an embodiment, each of said first and second travelling beam guides has a rectangular cross-section.

According to an embodiment, the spreader further comprises a beam suspension arrangement, wherein the main beam is suspended in said beam suspension arrangement and comprises a pair of opposite outer side wall faces, each outer side wall face provided with a side shift rail protruding therefrom and extending along a longitudinal direction of the main beam, each side shift rail resting on a respective vertical support of said suspension arrangement so as to allow moving the main beam on said vertical supports in said longitudinal direction, the main beam being guided along said longitudinal direction by a pair of side supports facing the respective outer side wall faces. Preferably, the side shift rails are attached to the lower C-beam; thereby, the rails may reinforce the relatively thinner material of the lower C-beam. Alternatively, the side shift rails may be attached to the upper C-beam; thereby, the relatively thicker material of the upper C-beam will provide for a high strength in the suspension of the main beam. Still alternatively, the side shift rails may be attached to an interface between the upper and lower C-beams; thereby, the rails may reinforce any weld interconnecting the upper and lower C-beams. According to an embodiment, each rail may have an L-shaped profile, wherein an upright portion of each L-shape may be welded or otherwise attached to the respective outer side wall face. Thereby, the upright portion may reinforce the respective side wall of the main beam. The side supports may be attached to the beam suspension arrangement. The vertical and/or side supports may be configured as slide pads, which may be made of a plastic such as polyurethane. According to an embodiment, the side supports are configured to guide the main beam at the height of the upper C-beam. Thanks to the relatively thicker material thickness of the upper C-beam, such an arrangement makes the spreader resistant to high side loads, i.e. loads on the spreader in a horizontal direction transversal to the guide axes. It may also allow forming lightening holes in the side walls of the lower C-beam without compromising the total strength of the main beam to typical loads, thereby even further reducing the weight of the spreader. Preferably, the side supports are located above the side shift rails. Such an arrangement permits the use of an upper C-beam of relatively limited vertical height, thereby keeping the weight of the spreader low.

According to an embodiment, each of said travelling beams rests on an inner bottom surface of the respective travelling beam guide via a respective slide pad arrangement, wherein each slide pad arrangement has a total length along the respective guide axis of at least 600 mm. Thereby, the weight of the travelling beams, and any load carried by them, will be distributed across a large portion of the travelling beam guide's bottom surface, allowing the material thickness of the lower C-beam to be minimized. Each slide pad arrangement may comprise a plurality of slide pads distributed along the length of the respective travelling beam guide.

According to an embodiment, the main beam has a first end, at which the first travelling beam is configured to extend from a travelling beam aperture of the first travelling beam guide, and a second end, at which the second travelling beam is configured to extend from a travelling beam aperture of the second traveling beam guide, wherein said first end of the main beam is provided with a first steel plate end collar enclosing the first travelling beam guide aperture and at least partly closing a rear end opening of the second travelling beam guide; and said second end of the main beam is provided with a second steel plate end collar enclosing the second travelling beam guide aperture and at least partly closing a rear end opening of the first travelling beam guide. According to an embodiment, each of said end collars may extend radially outwards from the hollow beam structure formed by the upper and lower C-beams. The end collars may extend in a plane perpendicular to the guide axes. The end collars will assist in maintaining the desired shape and cross-section of the main beam also when exposed to high loads. Preferably, the end collars are welded to the main beam. According to an embodiment, the travelling beam guides are rectangular, and each of said end collars forms a diagonal element across the respective rectangular rear end opening, so as to define a planar truss. Such an arrangement forms a particularly strong and light main beam.

According to an embodiment, said first and second twist-lock arrangements are configured to engage with lifting castings on a top face of the container. According to an embodiment, said first twist-lock arrangement comprises a first pair of twist-locks, which are spaced along a direction perpendicular to the first guide axis; said second twist-lock arrangement comprises a second pair of twist-locks, which are spaced along a direction perpendicular to the second guide axis; and said first and second pairs of twist-locks are arranged in a rectangular pattern for engaging with lifting castings arranged in a mating rectangular pattern on a top face of the container. Such a configuration of the twist-locks is typical of a top-lift spreader.

According to another aspect of said first concept, there is provided a method of producing a spreader main beam, the method comprising providing a first C-beam of a relatively thicker material thickness, said first C-beam comprising, as seen in cross-section, a web portion interconnecting a pair of flanges extending therefrom in the same general direction; providing a second C-beam of a relatively thinner material thickness, said second C-beam comprising, as seen in cross-section, a web portion interconnecting a pair of flanges extending therefrom in the same general direction; and welding the flanges of said first C-beam to the flanges of said second C-beam along a longitudinal direction of the C-beams, so as to form an elongate space enclosed by the flanges and web portions of the C-beams. Using such a method, a main beam as described hereinbefore may be provided. Clearly, the method steps need not be performed in the exact order suggested above.

According to an embodiment, the method further comprises welding an inner wall element to the web portion of the first C-beam along said longitudinal direction; and welding said inner wall element to the web portion of the second C-beam along said longitudinal direction.

According to a second concept, there is provided a travelling beam for an intermodal transport container spreader, such as the spreader described in any of the embodiments hereinabove, the travelling beam having a proximal end configured to be guided in a travelling beam guide of a main frame of the spreader so as to allow movement along a guide axis, and a distal end connected to a twist-lock arrangement, the travelling beam being characterized in being formed of a first, upper C-beam of a relatively thinner material thickness, said upper C-beam being oriented so as to define a downwards-facing channel; and a second, lower C-beam of a relatively thicker material thickness, said lower C-beam being oriented so as to define an upwards-facing channel, said upper and lower C-beams facing each other to define an inner space comprising said upper and lower channels. Using such a travelling beam, the overall weight of the travelling beam can be significantly reduced, with maintained or even increased strength. Similar to the main beam described hereinbefore, the upper and lower C-beams of the travelling beam may be welded together along a pair of longitudinal welds. The vertical height of the upper C-beam may be higher than the vertical height of the lower C-beam, thereby minimizing the weight of the travelling beam. The travelling beam may have a rectangular cross-section. At its proximal end, the travelling beam may be provided with an inner or outer reinforcement of the upper C-beam, thereby reinforcing its line of contact with the upper, inner surface of the respective travelling beam guide.

According to a third concept, there is provided a top-lift spreader for lifting an intermodal transport container, the top-lift spreader comprising a first pair of twist-locks and a second pair of twist-locks, wherein each pair of twist-locks comprises a first twist-lock and a second twist-lock, said first and second pairs of twist-locks being arranged in a rectangular pattern, a long side of which defines a longitudinal direction and a short side of which defines a transversal direction, the twist-locks being configured to engage with lifting castings arranged in a mating rectangular pattern on a top face of the container, each of said twist-locks comprising a male locking insert configured to be inserted into a top opening of the respective lifting casting, the male locking insert comprising an insert end portion which is twistable about a vertical rotation axis to a lock position for engaging with the respective lifting casting, wherein each pair of twist-locks is reconfigurable between a standard, ISO position mode, in which the distance between the rotation axis of the male locking insert end portion of the first twist-lock and the rotation axis of the male locking insert end portion of the second twist-lock is about 2258 mm, and a wide twist-lock position, WTP, mode, in which the distance between the rotation axis of the male locking insert end portion of the first twist-lock and the rotation axis of the male locking insert end portion of the second twist-lock is about 2448 mm, the spreader comprising an indicator configured to provide an indication if at least one pair of twist-locks is set in WTP mode when lowered onto respective lifting castings provided with top openings having a center-to-center distance corresponding to the ISO position mode. Here, the term "about" should be construed as being within an interval of +/−20 mm. Such an arrangement may assist in avoiding a potentially dangerous situation, in which the spreader is erroneously set in WTP position mode, and lowered onto a container having lifting castings transversally separated by a shorter distance according to ISO standard. The spreader may also be provided with a blocking arrangement configured to, based on the indication, prevent operating the twist-locks and/or lifting the container. The blocking arrangement may, by way of example, be implemented using an electronic control system; alternatively, it may comprise a blocking device mechanically linked to the indicator.

According to a variant of said third concept, there is provided a top-lift spreader for lifting an intermodal transport container, the top-lift spreader comprising a first pair of twist-locks and a second pair of twist-locks, wherein each pair of twist-locks comprises a first twist-lock and a second twist-lock, said first and second pairs of twist-locks being arranged in a rectangular pattern, a long side of which defines a longitudinal direction and a short side of which defines a transversal direction, the twist-locks being configured to engage with lifting castings arranged in a mating rectangular pattern on a top face of the container, wherein each pair of twist-locks is telescopically suspended to allow changing the longitudinal distance between the first pair of twist-locks and the second pair of twist-locks, and the twist-locks within each pair of twist-locks are telescopically suspended to allow changing the transversal distance between the first twist-lock and the second twist-lock, each twist-lock comprising a male locking insert configured to be inserted into a top opening of the respective lifting casting, the male locking insert comprising an insert end portion which is twistable about a vertical axis to a lock position; and an abutment face, flanking the male locking insert, the abutment face being configured to rest on a top surface of the respective lifting casting when the spreader has been lowered onto the container such that the male locking insert has been inserted into the top opening, wherein at least one, and preferably both twist-locks within at least one of said pairs of twist-locks comprises a landing indicator configured to detect when the abutment face is lowered onto the respective lifting casting top surface, wherein the landing indicator is configured to detect a portion of the lifting casting top surface transversally outside a transversally inner edge of the top opening of the respective lifting casting. Such a configuration of the landing indicators reduces the risk that the landing indicators provide a false landing indication, which reduces the risk that the twist-locks be actuated outside the lifting castings. In particular, the spreader will not receive a false landing indication when lowered onto a container with the twist-locks telescoped to a transversal distance wider than the width between the container's lifting castings. According to a preferred embodiment, each twist-lock within both twist-lock pairs is provided with a respective landing indicator of the above type.

According to an embodiment, the landing indicator comprises an actuator movable between a lower position, in which it protrudes below said abutment face, and an upper position, in which it is flush with said abutment face. Such an actuator may respond to direct contact with the upper surface of a lifting casting, and may be pushed to the upper position by the upper surface of the lifting casting. Preferably, the actuator is biased downwards towards the lower position by a resilient element, such as a spring. This will assure that the actuator will return to the lower position once the spreader has been released and lifted from the container.

According to an embodiment, the actuator comprises a U-shaped loop comprising a first loop leg and a second loop leg, said legs extending upwards from an intermediate portion interconnecting the loop legs, wherein each loop leg is guided in the vertical direction by a respective loop leg guide. Thereby, the intermediate portion may define the point of contact between the lifting casting and the actuator. With such a configuration, the presence of a lifting casting may be detected at any point along the length of the intermediate portion, which allows for a great degree of flexibility as regards the location of the loop leg guides. Moreover, the use of two guided loop legs will prevent accidentally twisting the actuator about a vertical axis, should the spreader accidentally touch an object with the actuator. This makes the actuator more resistant to damage. With a substantially straight intermediate portion, the length of the intermediate portion will be determined by the separation of the loop legs. Alternatively, the intermediate portion may follow a curve along the plane of the abutment face to cover any desired position along the abutment face.

According to an embodiment, said first loop leg is connected to a sensor configured to detect whether the loop is in its lower position or in its upper position, said first loop leg being located outside a vertical projection of the abutment face. Thereby, the sensor does not need to take up any substantial space directly above the abutment face, where space is limited and may be needed for other functions of the twist-lock. If desired, also the second loop leg may be located outside the vertical projection of the abutment face. Alternatively, it may be located within the vertical projection of the abutment face. It is not necessary that the second loop leg be provided with any sensing means. Thereby, the second loop leg may require no or very little space directly above the abutment face. The second loop leg also does not need to be provided with a spring, or any other resilient element. In fact, the second loop leg may be configured as a simple stub, which provides for a very compact arrangement.

According to an embodiment, at least one and preferably both twist-locks within said at least one of said pairs of twist-locks comprises a landing indicator configured to indicate, when the abutment face is lowered onto the respective lifting casting top surface, the presence of a portion of the lifting casting top surface transversally inside a transversally outer edge of the top opening of the respective lifting casting. Such a spreader reduces the risk of receiving false landing signals when misaligned onto adjacent containers. The landing indicator configured to indicate the presence of a portion of the lifting casting top surface transversally inside a transversally outer edge of the top opening of the respective lifting casting may be an auxiliary landing indicator, separate from the landing indicator configured to detect a portion of the lifting casting top surface transversally outside a transversally inner edge of the top opening of the respective lifting casting.

According to an embodiment, said landing indicator configured to detect a portion of the lifting casting top surface transversally outside a transversally inner edge of the top opening of the respective lifting casting is configured to generate an electronic landing confirmation signal, wherein at least one, and preferably both twist-locks within said at least one of said pairs of twist-locks further comprises an auxiliary landing indicator comprising an auxiliary actuator movable between a lower position, in which it protrudes below said abutment face, and an upper position, in which it is flush with said abutment face, wherein said auxiliary actuator is shaped to, when in the lower position, mechanically block the male locking insert end portion from turning to its lock position, and to, when in the upper position, provide clearance to allow the male locking insert end portion to turn to the lock position. Such a configuration provides an additional level of safety to the landing detection. According to an embodiment, said auxiliary actuator is located transversally inside the respective male locking insert, within the vertical projection of the abutment face. According to a preferred embodiment, each twist-lock within both twist-lock pairs is provided with a respective landing indicator of the above type.

According to an embodiment, said transversal distance between the first twist-lock and the second twist-lock is changeable between a predefined standard-body distance of about 2258 mm between center axes of the respective male locking inserts, and a predefined wide-body distance of about 2448 mm between center axes of the respective male locking inserts. Here, the term "about" should be construed as being within an interval of +/−20 mm.

According to a fourth concept, there is provided a spreader for lifting an intermodal transport container, the spreader comprising a spreader extension arrangement for variably changing a distance between a first twist-lock arrangement and a second twist-lock arrangement, wherein the spreader extension arrangement comprises a main frame comprising a hollow travelling beam guide; a travelling beam having a proximal end guided in the interior of the travelling beam guide so as to allow movement along a guide axis, and a distal end connected to one of said first and second twist-lock arrangements; and a hydraulic cylinder assembly configured to variably extend the distal end of said travelling beam from the travelling beam guide so as to change the axial distance between said first and second twist-lock arrangements to accommodate for containers of different axial lengths. The hydraulic cylinder is arranged at the exterior of the travelling beam guide. Such a design allows finalizing the hydraulic cylinder assembly and the main frame in parallel production lines, which reduces the time and cost of manufacturing a spreader.

According to an embodiment, the hydraulic cylinder has a first end attached to a top face of the main beam, and a second end attached to a top face of the distal end of the travelling beam. The top face is a particularly easy location to attach a hydraulic cylinder, since gravity will keep it in position while attaching it. Moreover, the hydraulic cylinder will be well protected from impact of e.g. a container to be lifted.

According to an embodiment, the hydraulic cylinder assembly further comprises a hydraulic connection assembly, which is configured to forward a hydraulic control signal to a hydraulic actuator other than said hydraulic cylinder. The hydraulic connection assembly is attached to the hydraulic cylinder. The use of the hydraulic cylinder as a carrier for hydraulic connections, such as hydraulic hoses and/or pipes, to other components enables an even more efficient manufacture of the spreader, since the hydraulic connection assembly may be pre-mounted onto the hydraulic cylinder before attaching the entire hydraulic cylinder assembly to the main frame and travelling beam. Such a design may also increase the overall strength of the main frame since, compared to designs of spreaders known in the art, the hydraulic connection assembly does not require a large number of attachment screw holes drilled in the main frame.

According to a second aspect of said fourth concept, there is provided a method of manufacturing a spreader for lifting an intermodal transport container, the method comprising: providing a main frame comprising a travelling beam guide; inserting a proximal end of a travelling beam into the travelling beam guide; positioning a hydraulic cylinder assembly, comprising a hydraulic cylinder for controlling the travelling beam and a hydraulic connection assembly configured to forward a hydraulic control signal to a hydraulic actuator other than said hydraulic cylinder, on an outer face of the main frame; attaching a first end of said hydraulic cylinder to the main frame; attaching a second end of said hydraulic cylinder to a distal end of said travelling beam; and connecting said hydraulic connection assembly to said hydraulic actuator other than said hydraulic cylinder.

According to a fifth concept, there is provided a top-lift spreader for lifting an intermodal transport container, the top-lift spreader comprising a first pair of twist-locks and a second pair of twist-locks, said first and second pairs of twist-locks being arranged in a rectangular pattern, a long side of which defines a longitudinal direction and a short side of which defines a transversal direction, the twist-locks being configured to engage with lifting castings arranged in a mating rectangular pattern on a top face of the container, wherein said first pair of twist-locks are interconnected by a transversal beam carried by a longitudinal beam, said transversal beam comprising an inner side wall, facing towards the center of the spreader, and an outer side wall, facing away from the center of the spreader, wherein the inner and outer side walls are separated in the longitudinal direction, the longitudinal beam extending through the inner side wall and into contact with the outer side wall, wherein the longitudinal beam is welded to each of said inner and outer side walls. Such a design provides for a high resistance to loads in the transversal, longitudinal, and vertical directions.

According to an embodiment, the transversal beam further comprises a bottom wall element having an inner edge extending beyond the inner side wall, to define a flange extending inwards in said longitudinal direction. Such a design provides for increased strength to any impacts on the transversal beam in the longitudinal direction. The flange may have a width, in the longitudinal direction, which gradually increases towards the location where the longitudinal beam interfaces the transversal beam. Preferably, the longitudinal beam is attached to the flange at this location. Such a shape of the flange provides for increased strength towards the center of the transversal beam, where the bending moment is the highest.

According to an embodiment, each of said inner and outer side walls has a respective upper wall portion which is inclined longitudinally inwards, towards the center of the spreader, so as to form an acute angle with a plane defined by said first and second pairs of twist-locks. Such a design provides for a particularly strong and rigid engagement between the longitudinal and transversal beams. Said upper wall portions of the inner and outer side walls may extend along substantially parallel planes. According to an embodiment, each of said inner and outer side walls also has a respective lower wall portion which forms an obtuse angle with the respective upper wall portion. The angled side walls form a very rigid structure. Preferably, the longitudinal beam penetrates the inner side wall at the interface between the upper and lower portions of the inner side wall, and is welded to the lower and upper wall portions of the inner and outer side walls.

According to an embodiment, the transversal beam has a vertical height which gradually decreases from the transversal beam's interface with the longitudinal beam towards the respective ends of the transversal beam. Such a shape provides for increased strength towards the center of the transversal beam, where the bending moment generally is the highest, while permitting a reduced weight of the transversal beam's ends. Assuming a total length LT of the transversal beam, the gradual height decrease preferably extends in each direction to a respective position located less than ⅛*LT from the transversal beam's end. The transversal beam may define a hollow structural section, HSS, shape which, by way of its increased height towards the center, has a varying cross-section along its length in the transversal direction, with a vertically higher cross-section at its center. The gradually increasing height may be defined by respective upper edges of the inner and outer side walls. Preferably, the upper edges of the inner and outer side walls substantially coincide, as seen from the side, along said longitudinal direction. Preferably, the edges are interconnected by an upper wall extending along the length of the upper edges.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 3*a* is a diagrammatic view in perspective of a first embodiment of a main beam for a top-lift spreader;

FIG. 3*b* is a cross-section of the main beam of FIG. 3*a*, taken along the plane illustrated with a dashed rectangle and as seen along the arrows III-III;

DETAILED DESCRIPTION OF THE EXEMPLARY EMBODIMENTS

Figure 1:
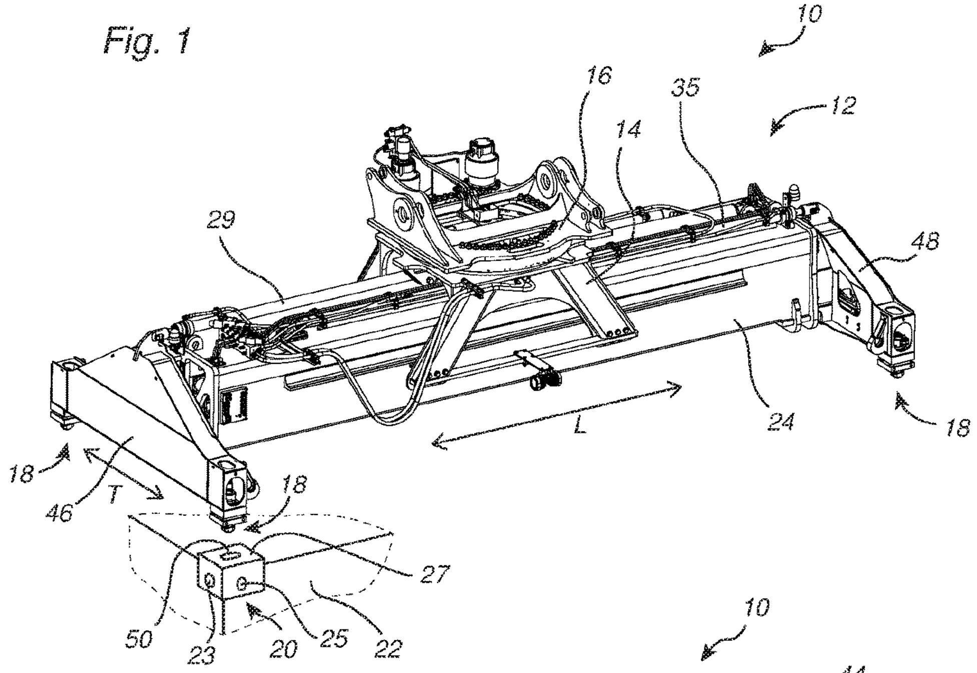
FIG. 1 is a diagrammatic view in perspective of a top-lift spreader for handling intermodal containers.

FIG. 1 illustrates a top-lift spreader 10 for lifting an intermodal transport container. The spreader 10 comprises a main frame 12, which is suspended in a suspension arrangement 14 in a manner allowing the main frame 12 to slide relative to the suspension arrangement 14 along a longitudinal direction L of the main frame 12. The spreader 10 is configured to be carried, via a rotator 16, by a spreader carrier (not illustrated), such as a container crane or a truck. Four twist-locks 18, three of which are visible in FIG. 1, are arranged in a rectangular pattern. The twist-locks 18 are configured to releasably attach, in a manner known in the art, to respective lifting castings 20 of a container 22 to be lifted by the spreader 10. The lifting casting 20 of FIG. 1 is a corner casting arranged at a corner of the container 22, which is typical of a 20-foot or 40-foot container. The lifting casting 20 has a short-side opening 23, a long-side opening 25, and a top opening 50 allowing the container 22 to be lifted from any direction. The spreader 10 is configured to telescopically translate the twist-locks 18 along the longitudinal direction L, as well as along a transversal direction T perpendicular to the longitudinal direction L, in a manner that will be elucidated with reference to FIGS. 2*a-b*.

Figure 2A:
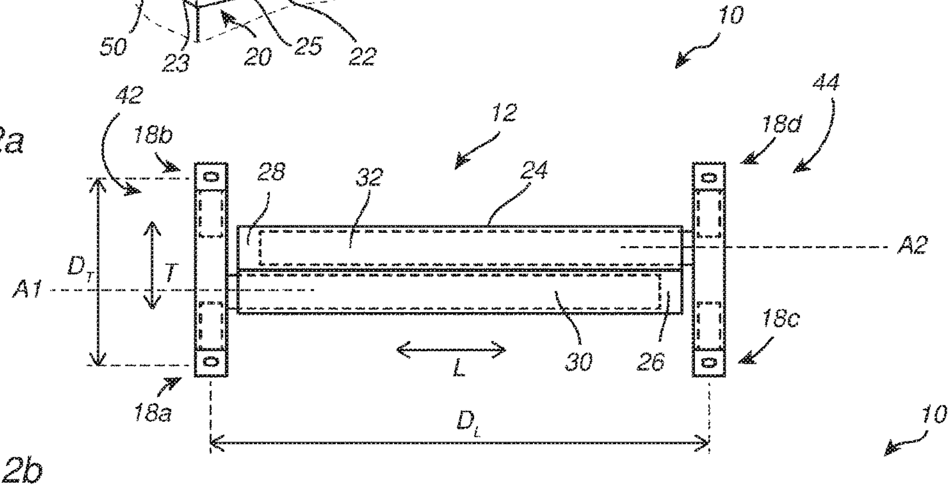
FIG. 2*a* is a diagrammatic view of the spreader of FIG. 1 as seen from below, wherein the spreader is in a first, contracted position.
Figure 2B:
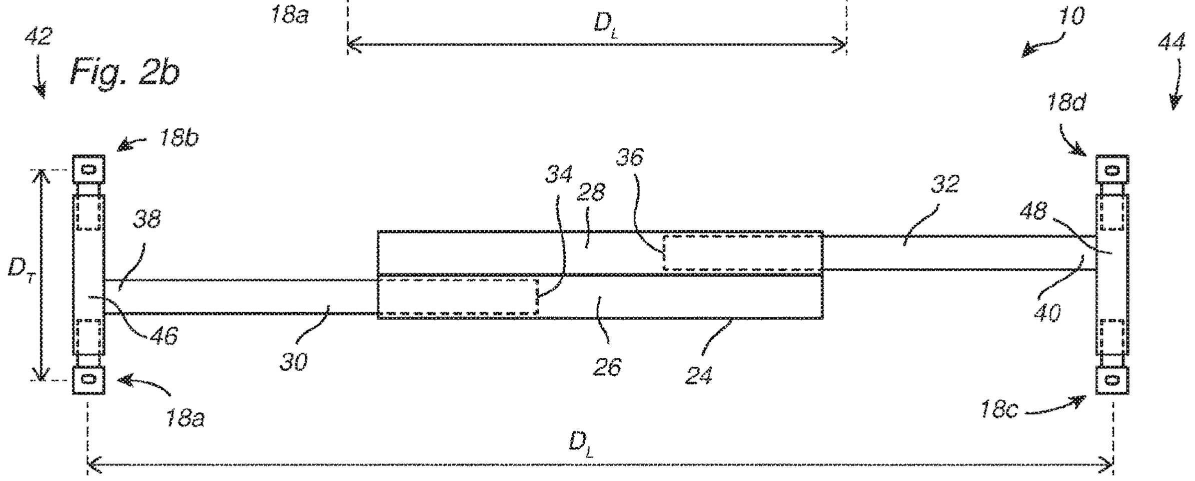
FIG. 2*b* is a diagrammatic view of the spreader of FIG. 1 as seen from below, wherein the spreader is in a second, extended position.

FIGS. 2*a*-2*b* schematically illustrate the spreader 10 in two different positions, as seen from below. For clarity of illustration, components of the spreader 10 unnecessary for illustrating the telescopic function are omitted in FIGS. 2*a-b*. The main frame comprises a main beam 24, which is hollow and defines a first travelling beam guide 26 and a second travelling beam guide 28. The travelling beam guides 26, 28 are mutually parallel, and parallel to the longitudinal direction of the main frame. The first travelling beam guide 26 guides a first travelling beam 30, which is movable along a first travelling beam guide axis A1. The second travelling beam guide 28 guides a second travelling beam 32, which is movable along a second travelling beam guide axis A2. In FIG. 2*a*, the spreader 10 is illustrated with the travelling beams 30, 32 fully retracted into the respective travelling beam guides 26, 28, whereas when in the position of FIG. 2*b*, only the proximal ends 34, 36 of the respective travelling beams 30, 32 remain in the respective travelling beam guides 26, 28. The first travelling beam 30 is operated by a first hydraulic cylinder 29 (FIG. 1), which has a first end attached to the main beam 24 and a second end attached to the first travelling beam 32. The second travelling beam 32 is operated by a second hydraulic cylinder 35 (FIG. 1) in a similar manner, mutatis mutandis. The hydraulic cylinders 29, 35 are arranged on the top face of the main beam 24, and extend along the length of the main beam 24. Distal ends 38, 40 of the travelling beams 30, 32 are connected to the twist locks 18 (FIG. 1) in such a manner that the distal end 38 of the first travelling beam 30 carries a first twist-lock arrangement 42 comprising a first pair 18*a-b* of said twist-locks 18, and the distal end 40 of the second travelling beam 32 carries a second twist-lock arrangement 44 comprising a second pair 18*c-d* of twist-locks 18. By varying the extent to which the travelling beams 30, 32 extend in opposite directions from the main beam 24, it is possible to adjust the longitudinal distance DL between the twist-lock arrangements 42, 44 to accommodate for containers of different axial lengths.

The first pair of twist-locks consists of a first twist-lock 18*a* and a second twist-lock 18*b*. Similarly, the second pair of twist-locks consists of a first twist-lock 18*c* and a second twist-lock 18*d*. The first and second pairs of twist-locks are arranged in a rectangular pattern, a long side of which extends along the longitudinal direction L and a short side of which extends along the transversal direction T, allowing the twist-locks 18*a-d* to engage with lifting castings 20 (FIG. 1) arranged in a mating rectangular pattern on a top face of a container to be lifted. The first and second twist-locks 18*a-b* of the first pair of twist-locks are telescopically suspended in a first transversal beam 46, which interconnects the twist-locks 18*a-b* and the distal end 38 of the first travelling beam 30. The transversal distance DT between the first and second twist-locks 18*a* and 18*b* of the first pair of twist-locks can thereby be varied by moving the twist-locks 18*a-b* towards or away from each other along the transversal direction T. The first and second twist-locks 18*c*, 18*d* of the second pair are suspended in a second transversal beam 48 in a similar manner, mutatis mutandis, allowing also the transversal distance between the first and second twist-locks 18*c*, 18*d* of the second pair to be varied. The transversal movement of the twist-locks 18*a-b* of the first pair is coordinated with the transversal movement of the twist-locks 18*c-d* of the second pair, such that the length of the short side of the rectangular pattern can thereby be varied.

In the view of FIG. 2*a*, the spreader 10 is contracted in the longitudinal and transversal directions L, T such that the rectangular pattern defined by the twist-locks 18*a-d* corresponds to the rectangular pattern defined by top openings 50 (FIG. 1) of the lifting castings 20 of an ISO-standard 20-foot by 8-foot intermodal container.

FIG. 2*b* illustrates the same spreader 10 extended in the longitudinal and transversal directions L, T such that the rectangular pattern defined by the twist-locks 18*a-d* corresponds to the rectangular pattern defined by the top openings of the lifting castings of a 40-foot "pallet-wide" intermodal container, which has a typical width in the transversal direction of about 8 feet 6 inches. Clearly, even though only two positions are illustrated in FIGS. 2*a-b*, the spreader can also be longitudinally extended to 40 feet while simultaneously remaining transversally contracted to eight feet, and vice versa.

FIGS. 3*a-b* illustrates a container spreader main beam 124 similar to a general type known in the art. The main beam 124, which may replace the main beam 24 and hence be integrated within a spreader 10 as described hereinbefore with reference to FIGS. 1 and 2*a-b*, is formed by a pair of rectangular HSS (Hollow Structural Section) steel beams 101, 102 of uniform material thickness. A typical material thickness of the HSS beams of a main beam 124 capable to withstand the weight of a laden 40-foot container may be about 12 mm. Each HSS beam 101, 102 defines a respective travelling beam guide 126, 128. The HSS beams 101, 102 are welded together along an upper longitudinal line 103 and a lower longitudinal line 104, to form the main beam 124. Top reinforcement bands 105 of steel plate are welded transversally across the outer top face of the main beam 124 at the predetermined, longitudinal positions along the main beam 124 where the proximal ends 34, 36 of the travelling beams 30, 32 will be located when the spreader is set in the 20- and 40-foot positions (c.f. FIGS. 2*a-b*), respectively. A typical material thickness of the top reinforcement bands 105 may be about 30 mm for spreaders capable of handling laden 40-foot containers. Similar bottom reinforcement bands 106 are welded transversally across the outer bottom face of the main beam 124, and reinforce the bottom at the same longitudinal positions. A pair of side shift rails 152, 154 extend in the longitudinal direction along opposite outer side wall faces 156, 158 of the main beam 124. The side shift rails 152, 154 allow the main beam 124 to be slidably suspended in a suspension arrangement 114 functionally corresponding to the suspension arrangement 14 of FIG. 1. Slide pads 109, attached to the suspension arrangement 114, reduce the friction in such sliding engagement, and steel plate side reinforcements 107, 108 are welded along the side wall faces 156, 158 in order to reinforce the main beam 124 against transversal loads from the suspension arrangement 114.

Figure 4A:
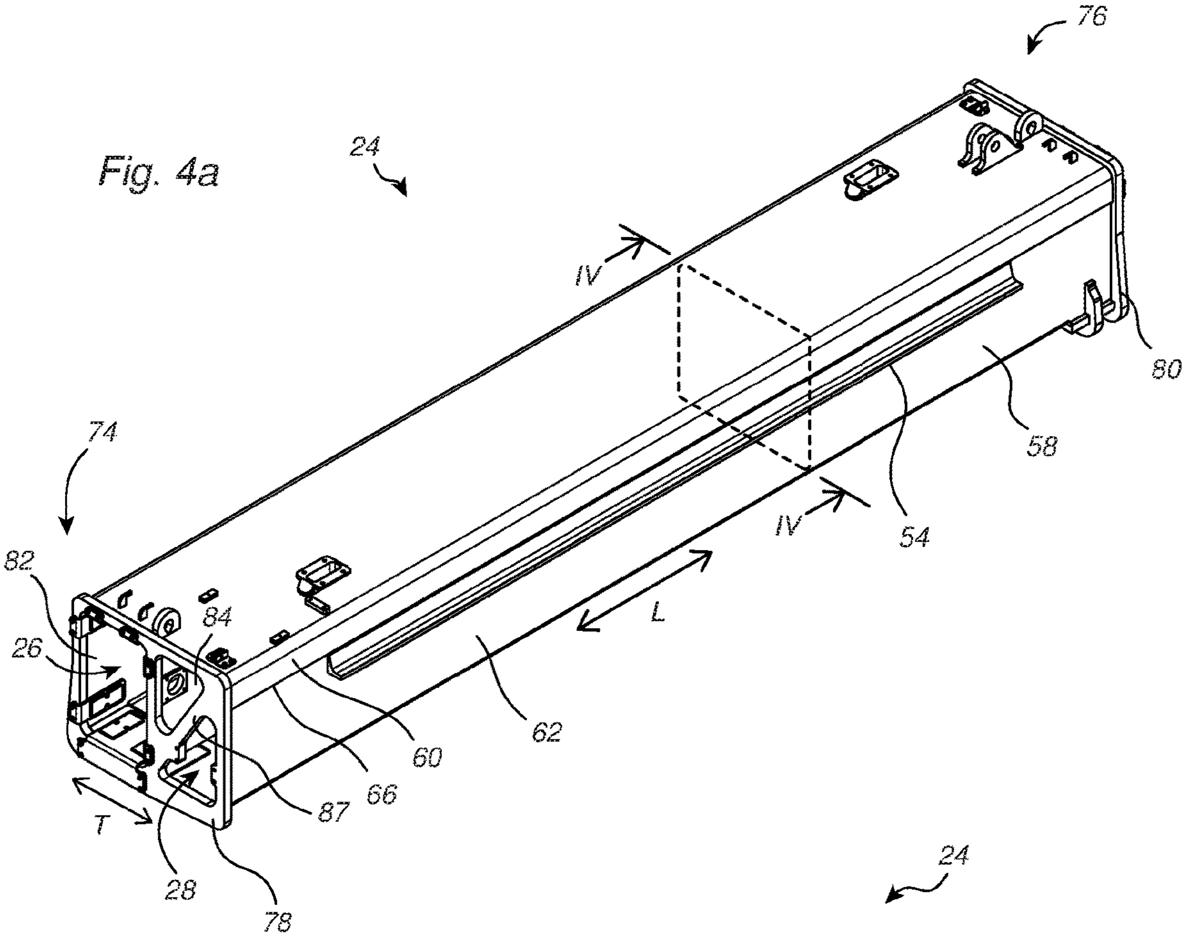
FIG. 4*a* is a diagrammatic view in perspective of a second embodiment of a main beam for a top-lift spreader.
Figure 4B:
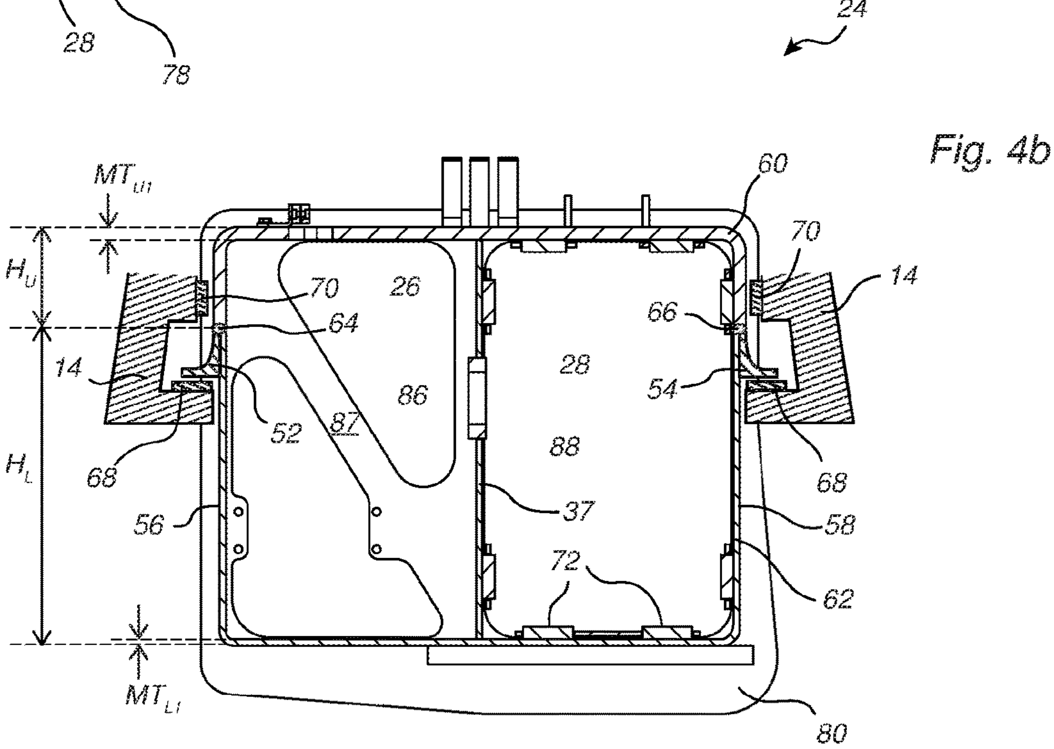
FIG. 4*b* is a cross-section of the main beam of FIG. 4*a*, taken along the plane illustrated with a dashed rectangle and as seen along the arrows IV-IV.

FIGS. 4*a-b* illustrate in greater detail the main beam 24 of FIGS. 1 and 2*a-b*, wherein FIG. 4*b* illustrates a cross-section of the main beam 24 as seen in a plane IV-IV perpendicular to the main beam's longitudinal direction L. The main beam 24 of FIGS. 4*a-b* is of a lighter and stronger design than the main beam 124 of FIGS. 3*a-b* for reasons that will be elucidated in the following. The main beam 24 is formed of a first, upper C-beam, or channel beam, 60 of a relatively thicker material thickness $MT_{U1}$, the upper C-beam 60 being oriented with its channel facing downwards; and a second, lower C-beam 62 of a relatively thinner material thickness, $MT_{L1}$, wherein relatively thicker in this context should be construed as thicker than the relatively thinner material thickness. The lower C-beam 62 is oriented with its channel facing upwards, towards the channel of the upper C-beam 60, such that the channels of the upper and lower C-beams 60, 62 face each other. The lower C-beam 62 may have a material thickness $MT_{L1}$ of less than ⅔ of the material thickness $MT_{U1}$ of the upper C-beam 60. In the particular example illustrated, the lower C-beam 62 has a material thickness $MT_{L1}$ of about half the material thickness $MT_{U1}$ of the upper C-beam 60. By way of example, the upper C-beam 60 may be made of steel plate having a thickness $MT_{U1}$ of about 20 mm, whereas the lower C-beam 62 may be made of steel plate having a thickness $MT_{L1}$ of about 10 mm.

As seen in the section plane IV-IV, the lower C-beam 62 has a vertical height HL which is higher than the vertical height $H_U$ of the upper C-beam 60. The upper and lower C-beams 60, 62 are welded directly together along a pair of longitudinal welds 64, 66, to form a main beam 24 of a generally rectangular cross-section. A vertical separation wall 37 extends between the upper and lower C-beams 60, 62, and divides the inner space defined by the upper and lower C-beams 60, 62 into said first and second travelling beam guides 26, 28, thereby making also the travelling beam guides 26, 28 substantially rectangular in cross-section. The separation wall 37 may be provided with a plurality of lightening holes (not shown). A pair of L-shaped side shift rails 52, 54 are welded to the lower C-beam 62 and extend in the longitudinal direction along opposite outer side wall faces 56, 58 of the main beam 24, thereby allowing the main beam 24 to be slidably suspended in the suspension arrangement 14. The thinner material thickness of the lower C-beam 62 allows the side shift rails 52, 54 to be countersunk laterally inside the outer side wall faces of the upper C-beam 60, and attached directly below the same, so as to vertically bear against the lower longitudinal edges of the upper C-beam 60. Thereby, the vertical load of the main beam 24 will be vertically applied directly onto the side shift rails 52, 54, reducing the strain on the welds connecting the side shift rails 52, 54 to the main beam 24. Each side shift rail 52, 54 rests in the suspension arrangement 14 on a set of slide pads 68, of which one on each side of the main beam 24 is illustrated in the cross-section of FIG. 4*b*. A set of side support pads 70 face the outer side wall faces 56, 58 above the welds 64, 66, and guide the main beam 24 along the longitudinal direction L. Inner bottom slide pads 72 are arranged on inner bottom faces of the respective travelling beam guides 26, 28 adjacent to their respective guide apertures 86, 88. The inner bottom slide pads 72 are configured to support the travelling beams 30, 32, and provide a distribution of the weight of the travelling beams 30, 32 across said inner bottom faces. Similar slide pads (not illustrated) are attached to outer top and bottom faces of the proximal end 34, 36 of each travelling beam 30, 32. The slide pads 72 each have a length, in the longitudinal direction L, of about 400 mm, i.e. the total slide pad length carrying each travelling beam 30, 32 is about 800 mm.

The main beam 24 is, at each of a first end 74 and a second end 76, provided with a respective steel plate end collar 78, 80 extending outwards from the hollow structure defined by the upper and lower C-beams along a respective plane perpendicular to the longitudinal direction L. As is illustrated in FIGS. 4*a-b*, the first end collar 78 encloses a beam guide aperture 82 of the first travelling beam guide 26 and partly closes a rear end opening 84 of the second travelling beam guide 28. In a similar manner, the second end collar 80 encloses a beam guide aperture 88 of the second travelling beam guide 28 and partly closes a rear end opening 86 of the first travelling beam guide 26. Each of said end collars 78, 80 also forms a diagonal truss element 87 across the respective rear end opening 84, 86.

Figure 5:
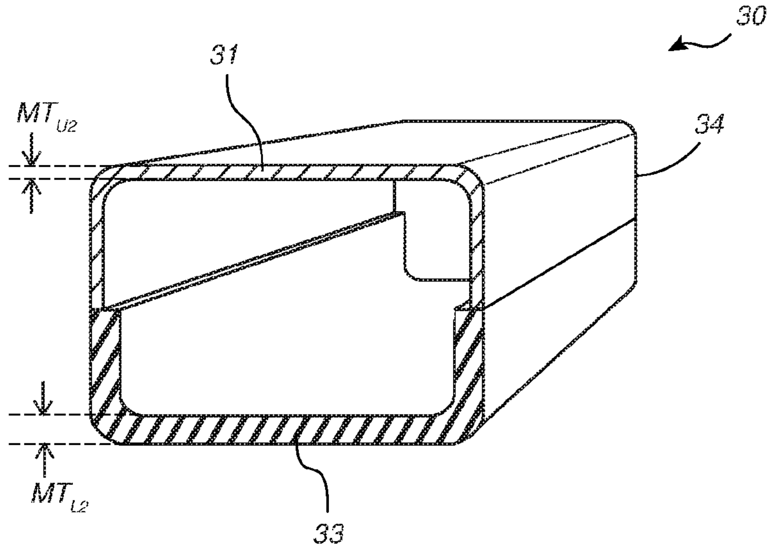
FIG. 5 is a schematic view in perspective, and in cross-section, of a travelling beam for a spreader.

FIG. 5 illustrates a cross-section of an exemplary embodiment of the first travelling beam 30. Needless to say, the second travelling beam 32 (FIG. 2) may be constructed in a similar manner. The first travelling beam 30 is formed of a first, upper C-beam, or channel beam, 31 of a relatively thinner material thickness $MT_{U2}$, the upper C-beam 31 being oriented with its channel facing downwards; and a second, lower C-beam 33 of a relatively thicker material thickness, $MT_{L2}$, wherein relatively thicker in this context should be construed as thicker than the relatively thinner material thickness. The lower C-beam 33 is oriented with its channel facing upwards, towards the channel of the upper C-beam 31, such that the channels of the upper and lower C-beams 31, 33 face each other. The upper C-beam 31 may, for example, have a material thickness $MT_{U2}$ of less than ⅔ of the material thickness $MT_{L2}$ of the lower C-beam 33. In the particular example illustrated, the upper C-beam 31 has a material thickness $MT_{U2}$ of about half the material thickness $MT_{L2}$ of the lower C-beam 33. By way of example, the upper C-beam 31 may be made of steel plate having a thickness $MT_{U2}$ of about 10 mm, whereas the lower C-beam 33 may be made of steel plate having a thickness $MT_{L2}$ of about 20 mm. Similar to the main beam 24, the upper and lower C-beams 31, 33 of the travelling beam 30 are welded together along a pair of welds extending in the longitudinal direction L.

Optionally, the proximal end 34 of the upper C-beam 31 may be provided with a reinforcement (not illustrated), which may reinforce the travelling beam 30 at its location where the proximal end 34 applies its load onto the upper, inner surface of the travelling beam guide 26 (FIG. 4*b*). By way of example, the reinforcement may be configured as steel plate end cover at least partly closing the hollow structure defined by the upper and lower C-beams 31, 33 at the proximal end 34, similar to the collar 78, 80 of the main beam 24, or as a transversal reinforcement band, similar to the bands 105 of FIG. 3*a*, welded to the inside or outside surface of the upper C-beam 31 at the proximal end 34.

Figure 6:
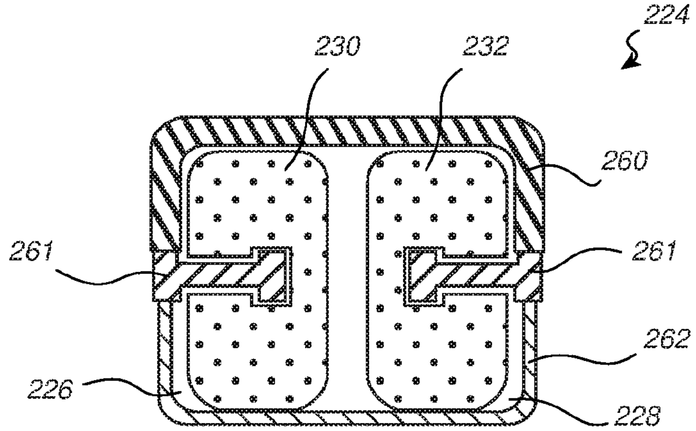
FIG. 6 is a cross-section of a third embodiment of a main beam for a spreader.

FIG. 6 schematically illustrates a cross-section of yet an embodiment of a main beam 224 for a spreader, such as a side-lift spreader or the top-lift spreader 10 of FIG. 1. The main beam 224 comprises an upper C-beam 260 of relatively thicker material thickness, and a lower C-beam 62 of relatively thinner material thickness. The upper and lower C-beams 60, 62 are rigidly attached to each other via a pair of intermediate elements 261. A pair of travelling beams 230, 232 are guided inside the inner space enclosed by the upper and lower C-beams 260, 262; in this respect, the main beam 224 forms a pair of parallel guides 226, 228 for the respective travelling beams 230, 232. The intermediate elements 261 extend inwards into the main beam 224 to form guide rails, which form-fittingly keep the travelling beams 230, 232 apart. FIGS. 7-12*b* illustrate a number of different lifting scenarios that the spreader 10 (FIG. 1) may encounter when lifting a container 22. Each figure schematically illustrates the spreader from the side, as seen along the longitudinal direction, and hence illustrates a transversal beam 46 provided with a respective pair of telescopically arranged twist-locks 18*a*-*b*.

Figure 7:
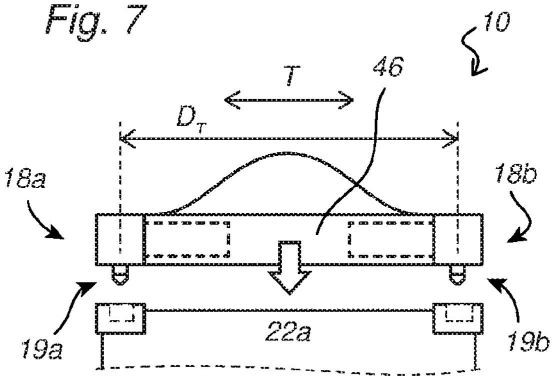
FIGS. 7-12*b* are schematic side views of the top-lift spreader of FIG. 1, as seen along the spreader's longitudinal direction, in different scenarios in which the spreader is lowered onto containers of different types.

FIG. 7 illustrates the spreader when set in an ISO standard position mode, i.e. its transversal center-to-center distance DT between the male locking inserts 19*a*-*b* of the twist-locks 18*a*-*b* is adjusted for lifting an ISO standard container having a width of 8 feet. The container 22*a* to be lifted is an ISO standard container having a width in the transversal direction T of 8 feet.

Figure 8:
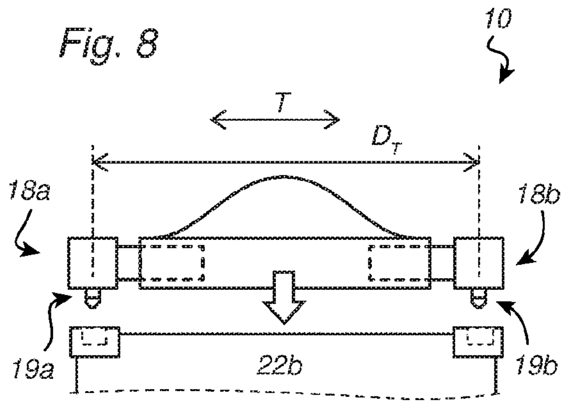

FIG. 8 illustrates the spreader 10 when set in a "wide twist-lock position", WTP, mode, i.e. its transversal center-to-center distance DT between the male locking inserts 19*a*-*b* of the twist-locks 18*a*-*b* is adjusted for lifting a so-called "pallet-wide container" or "wide-body container". The pallet-wide container 22*b* to be lifted has a width in the transversal direction T adapted for accommodating two standardized pallets next to each other, and therefore is slightly wider than an ISO container. It has a width in the transversal direction T of about 8 feet and 6 inches. The pallet-wide container 22*b* has its lifting castings separated by 6 inches more than an ISO standard container, and may therefore be termed a WTP pallet-wide container.

Figure 9:
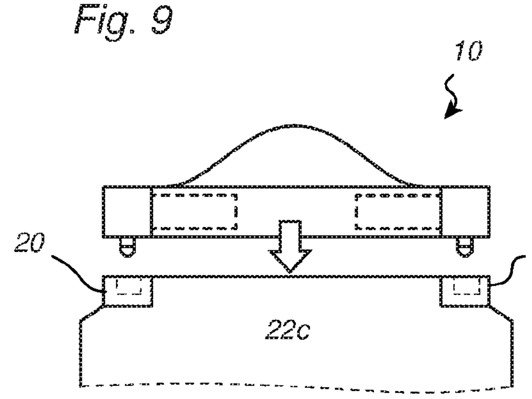
Figure 10:
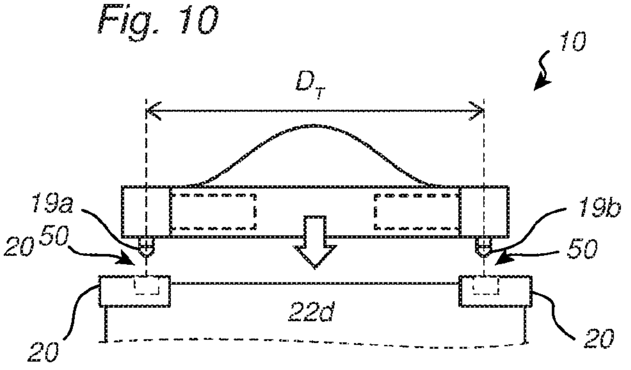

FIG. 9 illustrates the spreader 10 set in the ISO standard position mode. The container 22*c* to be lifted is of a first type of pallet-wide container with lifting castings 20 in ISO position. Thanks to having its lifting castings 20 in the more common ISO position, the intermodal container 22*c* can, as it is moved by different trucks and cranes along its route of transport, be lifted by spreaders capable of handling ISO containers only. The container 22*c* has a wider body of about 8 feet and 6 inches, but the transversal distance between its top corner castings 20 is the same as that of ISO containers.

FIG. 10 again illustrates the spreader 10 set in the ISO standard position mode. The container 22*d* to be lifted is of a second type of pallet-wide container with lifting castings 20 in ISO position. The container 22*d* differs from the container 22*c* of FIG. 9 in that the lifting castings 20 extend outwards to the full width of the pallet-wide container body, allowing the lifting castings 20 to be accessed also from the side by e.g. a side-lift spreader (not illustrated), whereas the top openings 50 (illustrated schematically with dashed lines) are separated by a center-to-center distance DT corresponding to the center-to-center distance between the male locking inserts 19*a*-*b* when the spreader 10 is in ISO position. This allows the container 22*d* to be lifted by the spreader 10 in ISO position, even though the container 22*d* has a wider body of about 8 feet and 6 inches.

Figure 11A:
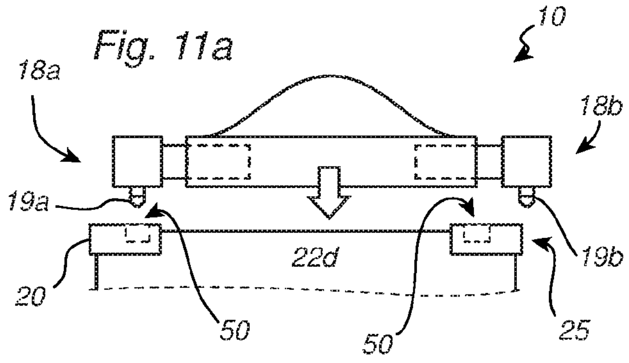
Figure 11B:
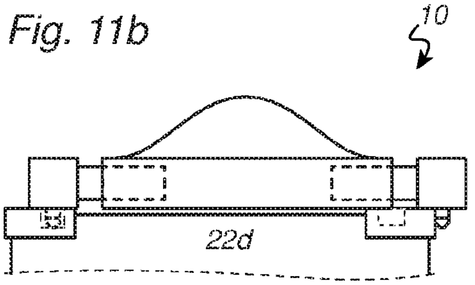

FIG. 11*a* illustrates a first potentially dangerous situation. The container 22*d* is again of the second type of pallet-wide container with lifting castings 20 in ISO position, which is described with reference to FIG. 10. However, the spreader 10 is erroneously set in WTP mode; this may, by way of example, happen due to human mistake. In particular, the locations of the top openings 50 are not visible from below. It is very difficult, and in some situations impossible, to see the difference between a WTP wide-body container 22*b* (FIG. 8), and said second type of pallet-wide container 22*d* (FIG. 10) with lifting castings 20 in ISO position, from e.g. a reach stacker below a stack of containers. Therefore, a reach stacker truck driver will generally have to read, and rely on, container type codes written on the containers for their type identification. Container type codes may also be worn or otherwise difficult to read. The interpretation of container type codes requires knowledge and skill, and also requires the reach stacker driver to be attentive and focussed. When lowered onto the container 22*d* to the position illustrated in FIG. 11*b*, the male part 19*a* of the first twist-lock 18*a* is inserted into the respective lifting casting 20, whereas the male part 19*b* of the second twist-lock 18*b* is lowered just outside the container 22*d*. Twisting the twist-locks to their lock positions, and thereafter lifting the spreader 10, will damage the container 22*d*, and may also result in dropping the container 22*d* to the ground. In particular, the latter may occur if the second male part 19*b* engages with a long-side opening 25 (FIG. 1) of the lifting casting 20, allowing the container 22*d* to follow the spreader 10 up as it is lifted.

Figure 12A:
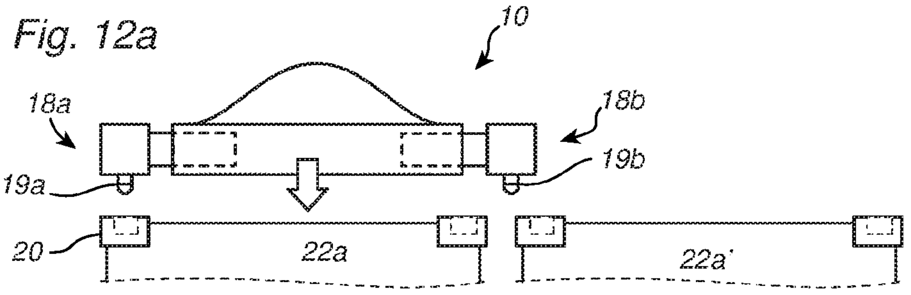
Figure 12B:
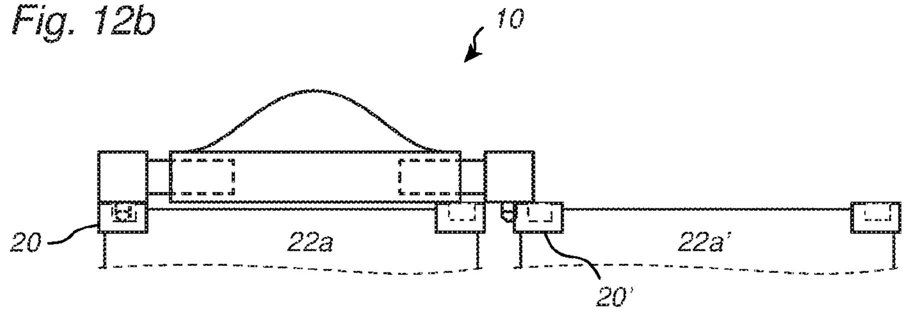

FIG. 12*a* illustrates a second potentially dangerous situation. The containers 22*a*, 22*a*' are standard ISO dimension containers of the type described with reference to FIG. 7. However, the spreader 10 is erroneously set in WTP mode; this may, by way of example, happen due to human mistake. When lowered onto the container 22*a* to the position illustrated in FIG. 12*b*, the male part 19*a* of the first twist-lock 18*a* is inserted into the respective lifting casting 20, whereas the second twist-lock 18*b* is lowered onto the lifting casting 20' of an adjacent container 22*a*', with its male locking insert 19*b* just outside the adjacent container 22*a*'. Locking and lifting the spreader 10 from this position may damage the containers 22*a*, 22*a*', and could potentially also result in dropping the container 22*a* to the ground.

Figure 13:
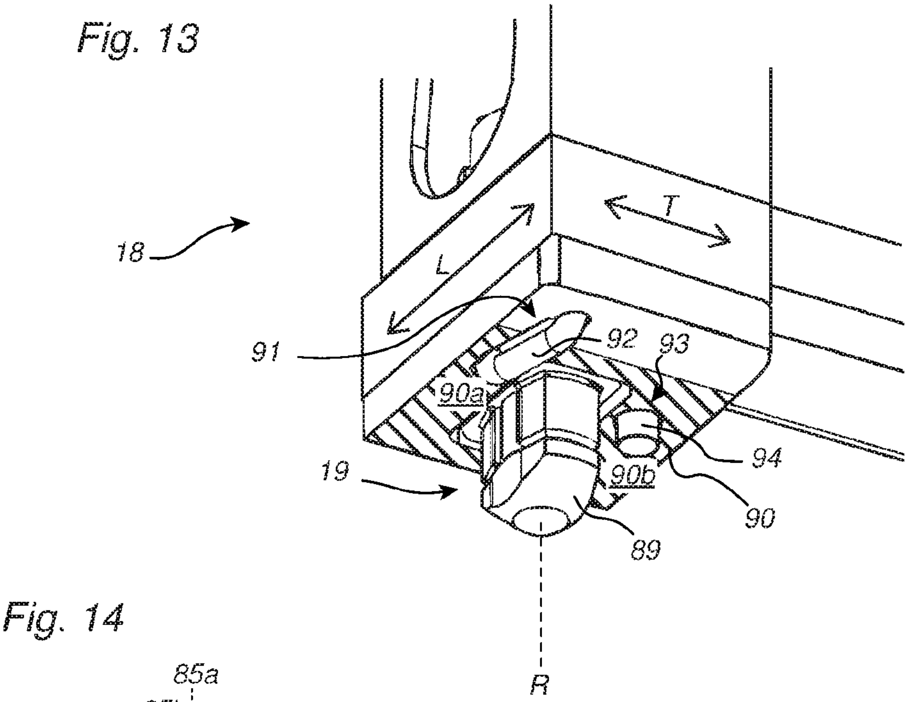
FIG. 13 is a diagrammatic view in perspective of a twist-lock of the top-lift spreader of FIG. 1, the twist-lock being provided with two separate landing indicator arrangements.

FIG. 13 illustrates a twist-lock 18 capable of avoiding the dangerous situations of FIGS. 11*a-b* and 12*a-b*. The twist-lock 18 comprises a male locking insert 19 configured to be inserted into a top opening 50 (FIG. 1) of a respective lifting casting 20. Once inside the lifting casting 20, an end portion 89 of the male locking insert 19 is configured to be twisted 90° about a vertical axis R to a lock position, in which it engages with the lifting casting 20. An abutment face 90 (hatched), flanking the male locking insert 19, corresponds to the size and shape of the top surface 27 (FIG. 1) of the lifting casting 20, and is configured to rest thereupon once the spreader 10 (FIG. 1) has been lowered onto the container 22. A first landing indicator 91 has a vertically movable indicator body 92, a portion of which protrudes downwards from the abutment face 90. The indicator body 92 is located on a distal side 90*a* of the male locking insert 19, i.e. outside the male locking insert 19 along the transversal direction T. The first landing indicator 91 is configured to indicate when the upper surface 27 of the lifting casting 20 presses the vertically movable indicator body 92 vertically into the abutment face 90 of the twist-lock 18, as the abutment face 90 is lowered into abutment on the respective lifting casting top surface 27. Thereby, the first landing indicator 91 allows verifying that a transversally distal portion 90*a* of the abutment face 90 rests upon a lifting casting 20, before the twist-lock 18 is locked. This facilitates avoiding the potentially dangerous situation of FIGS. 11*a-b*. A second landing indicator 93 has a vertically movable indicator body 94, a portion of which protrudes downwards from the abutment face 90. The indicator body 94 is located on a proximal side 90*b* of the male locking insert 19, i.e. inside the male locking insert 19 along the transversal direction T. The second landing indicator 93 is configured to indicate when the upper surface 27 of the lifting casting 20 presses the vertically movable indicator body 94 vertically into the abutment face 90 of the twist-lock, as the abutment face 90 is lowered onto the lifting casting top surface 27. Thereby, the second landing indicator 93 allows verifying that a transversally proximal portion 90*b* of the abutment face 90 rests upon a lifting casting 20, before the twist-lock 18 is locked. This facilitates avoiding the potentially dangerous situation of FIGS. 12*a-b*.

Figure 14:
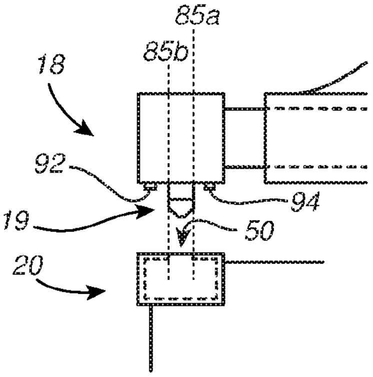
FIG. 14 is a schematic side view of the twist-lock of FIG. 13, as seen along the spreader's longitudinal direction, in a position aligned with the top opening of a lifting casting.
Figure 15:
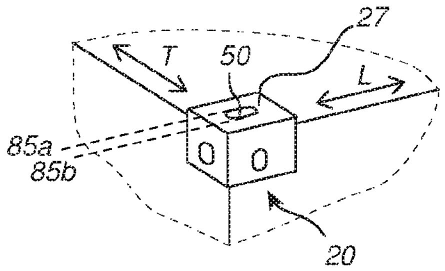
FIG. 15 is a schematic view in perspective of a corner casting of an intermodal container.

FIGS. 14-15 illustrate the geometry, as the twist-lock 18 lands on the lifting casting 20, in greater detail. In the illustrated example, the indicator body 92 of the first landing indicator 91 is located transversally outside a transversally outer edge of the male locking insert 19, so as to detect the presence of a portion of the upper surface 27 of the lifting casting 20 transversally outside a transversally outer edge 85*b* of the top opening 50. However, in order to avoid the potentially dangerous situation of FIG. 11*b*, it is sufficient that the first landing indicator 91 be configured to detect the presence of a portion of the upper surface 27 of the lifting casting 20 transversally outside a transversally inner edge 85*a* of the top opening 50. Hence, even though it may, for space considerations, be preferred to have the indicator body 92 located at the illustrated position transversally outside the male locking insert 19, it may, as an alternative, be located transversally aligned with the male locking insert 19. Similarly, in the illustrated example, the indicator body 94 of the second landing indicator 93 is located transversally inside a transversally inner edge of the male locking insert 19, so as to detect the presence of a portion of the upper surface 27 of the lifting casting 20 transversally inside a transversally inner edge 85*a* of the top opening 50. However, in order to avoid the potentially dangerous situation of FIG. 12*b*, it is sufficient that the second landing indicator 93 be configured to detect the presence of a portion of the upper surface 27 of the lifting casting 20 transversally inside a transversally outer edge 85*a* of the top opening 50. Hence, even though it may, for space considerations, be preferred to have the indicator body 94 located at the illustrated position transversally inside the male locking insert 19, it may, as an alternative, be located transversally aligned with the male locking insert 19. A single indicator body transversally aligned with the male locking insert may, in fact, assist in avoiding both potentially dangerous situations of FIGS. 11*b* and 12*b*.

Figure 16:
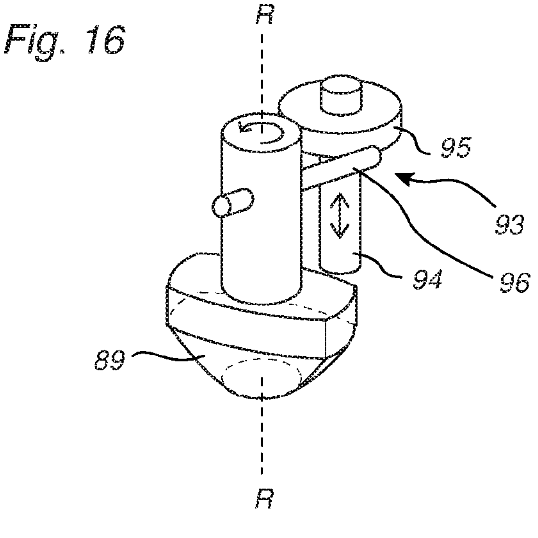
FIG. 16 is a diagrammatic detail view in perspective illustrating one of the landing indicator arrangements of FIG. 13.

FIG. 16 illustrates the second landing indicator 93 in greater detail. The rotatable male locking insert end portion 89 is provided with a blocking pin 96 extending radially from an upper portion of the male locking insert end portion 89. The vertically movable indicator body 94 comprises a blocking element 95 shaped to, when in the lower position as illustrated in FIG. 16, mechanically block the blocking pin 96 from swinging past the blocking element 95, and thereby mechanically block the male locking insert end portion 89 from turning to the lock position. When in the upper position (not illustrated), clearance is provided below the blocking element 95 to allow the blocking pin 96 to swing below the blocking element 95. Preferably, the indicator body 94 is resiliently biased towards a lower position in which it protrudes from the abutment face 90.

Figure 17A:
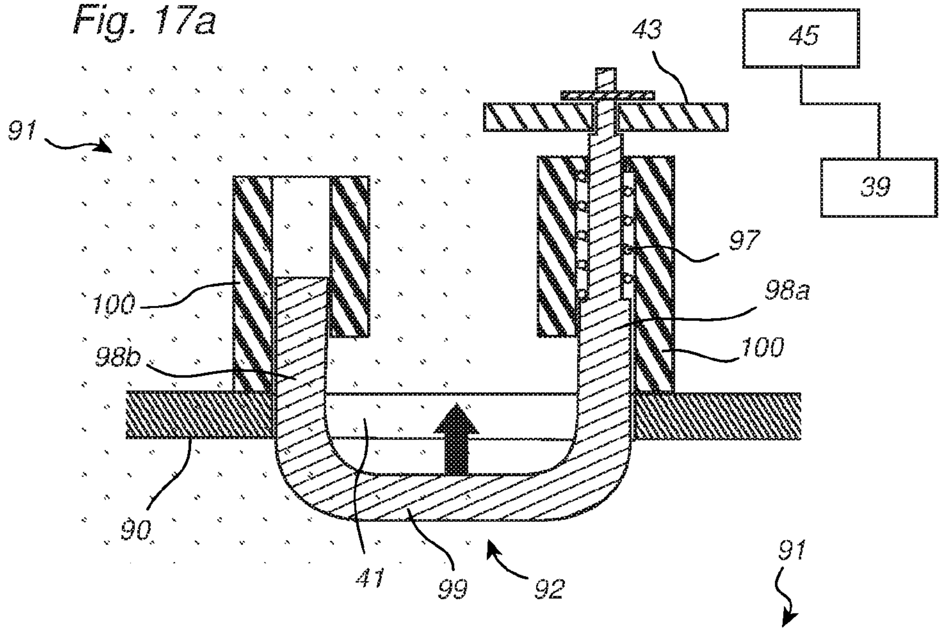
FIG. 17*a* is a diagrammatic view in section illustrating the other of the landing indicator arrangements of FIG. 13 when in a lower position.
Figure 17B:
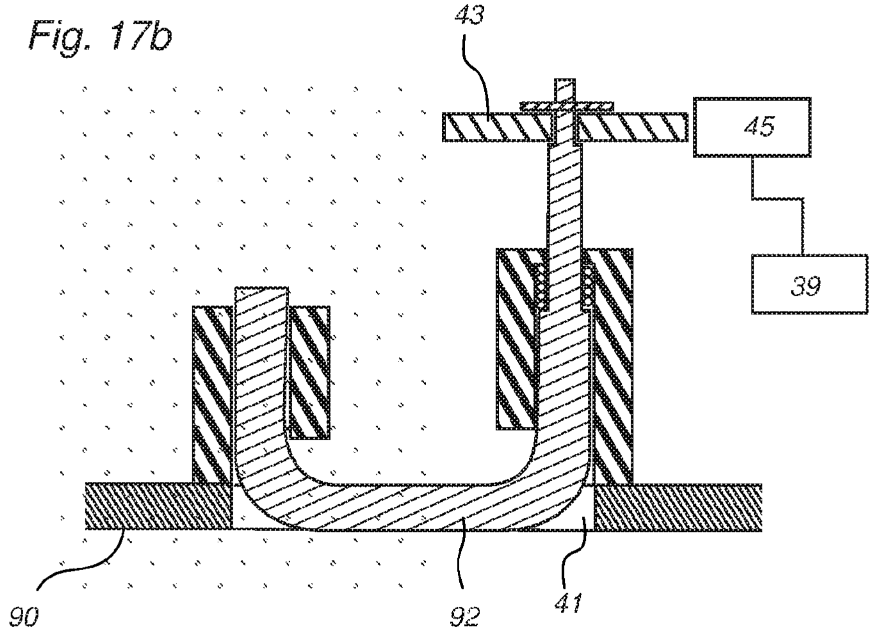
FIG. 17*b* is a diagrammatic view corresponding to the view of FIG. 17*a*, in which said other of the landing indicator arrangements has been pushed to an upper position by the top surface of a lifting casting.
Figure 18:
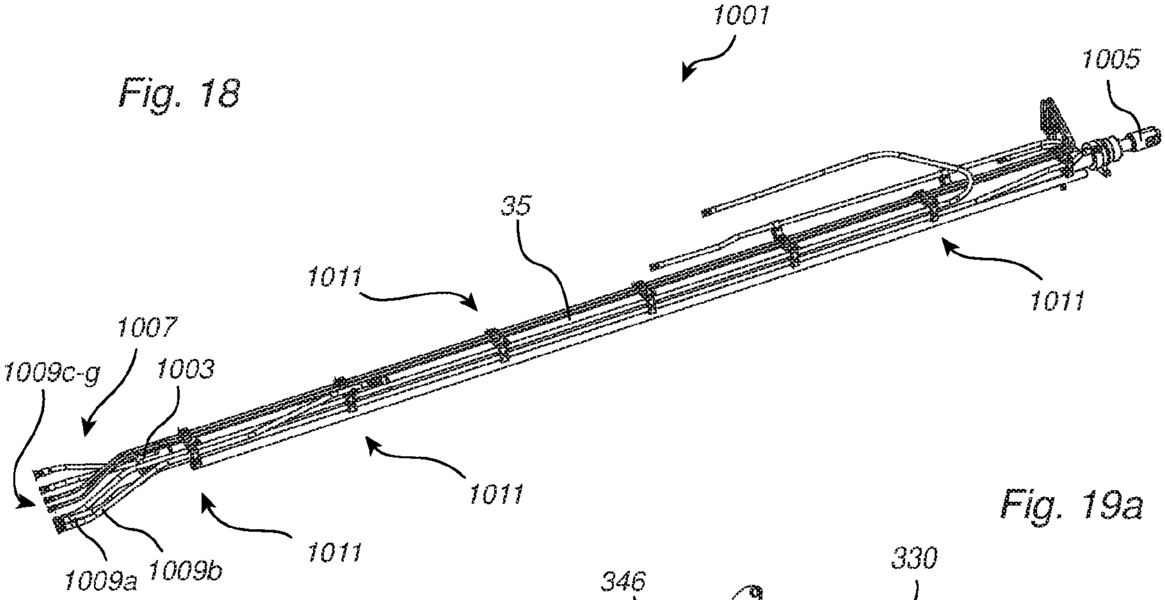
FIG. 18 is a schematic view in perspective of a hydraulic cylinder assembly for operating a travelling beam of the spreader of FIG. 1.
Figure 19A:
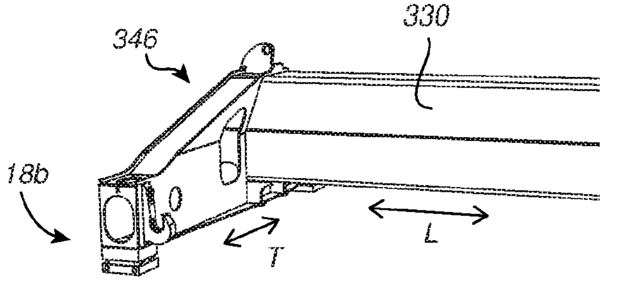
FIG. 19*a* is a schematic view in perspective of an alternative embodiment of a transversal beam attached to a longitudinal beam.
Figure 19B:
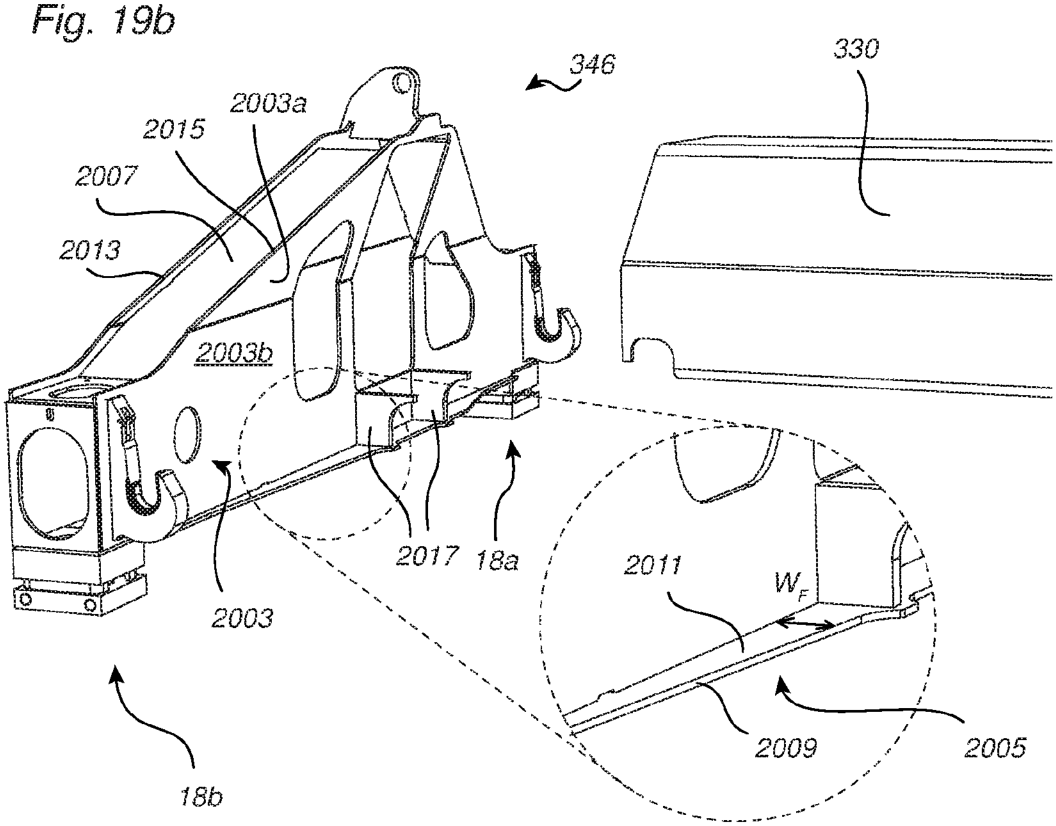
FIG. 19*b* is an exploded view of the transversal and longitudinal beams of FIG. 19*a;*
Figure 19C:
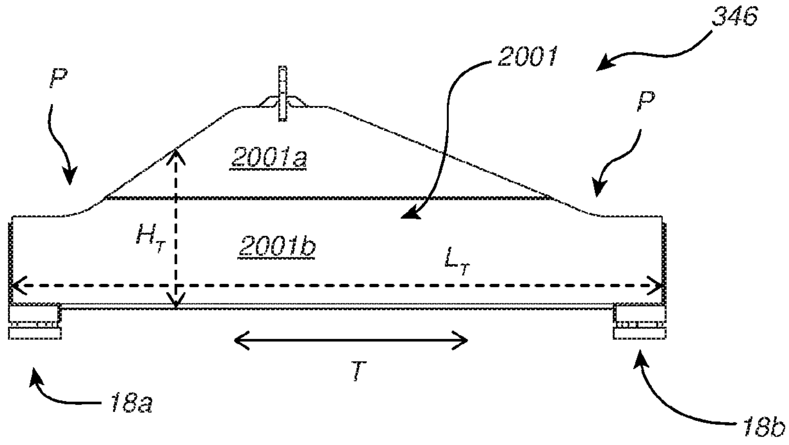
FIG. 19*c* is a schematic side view of the transversal beam of FIG. 19*a*, as seen along the spreader's longitudinal direction.
Figure 19D:
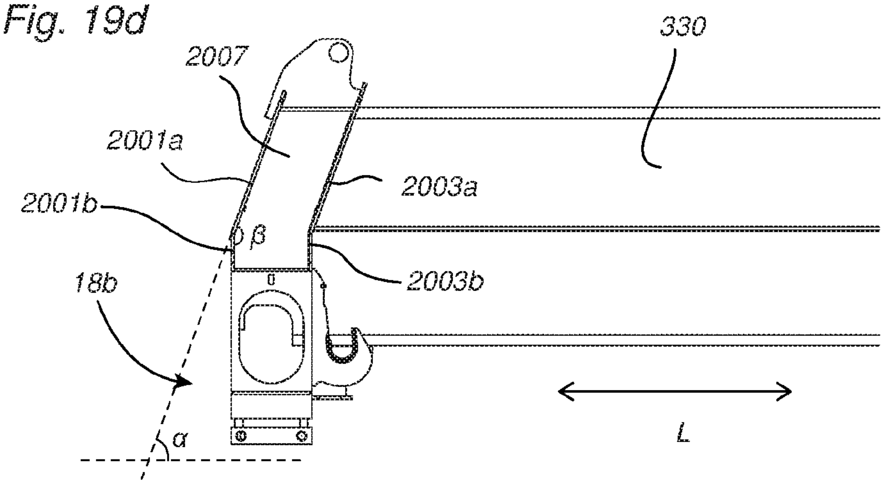
FIG. 19*d* is a schematic side view of the transversal and longitudinal beams of FIG. 19*a* as seen along the spreader's transversal direction.
Figure 19E:
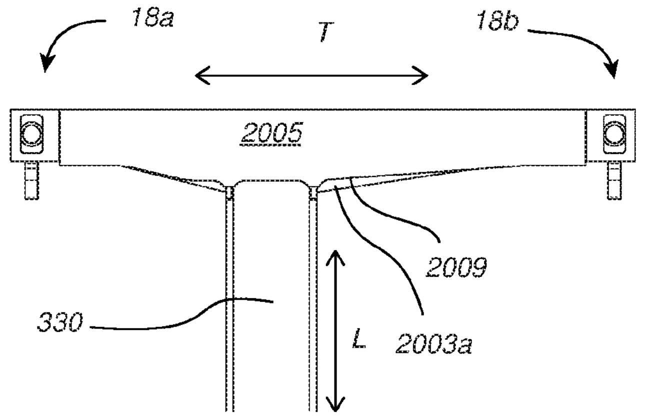
FIG. 19*e* is a schematic view of the transversal and longitudinal beams of FIG. 19*a* as seen vertically from below.

The cross-sections of FIGS. 17*a-b* illustrate the first landing indicator 91 in greater detail. In FIG. 17*a*, the indicator body 92 is in a lower position, in which it protrudes below the abutment face 90, whereas FIG. 17*b* illustrates the indicator body 92 in an upper position, in which it is flush with the abutment face 90. A spring 97 applies a bias, pressing the indicator body 92 towards its lower position. The indicator body 92 is shaped as a U-shaped loop, comprising a first loop leg 98*a* and a second loop leg 98*b*, said legs 98*a-b* extending upwards from an intermediate portion 99 interconnecting the loop legs 98*a-b*, wherein each loop leg 98*a-b* is guided in the vertical direction by a respective loop leg guide 100. An elongate track 41 in the abutment face 90 allows the intermediate portion 99 of the indicator body 92 to be received therein in its entirety. The first loop leg 98*a*, which is located outside the vertical projection (dotted area) of the abutment face 90, is provided with a washer 43. An inductive sensor 45 is configured to detect the presence of the washer 43 when the loop 92 is in its upper position. The inductive sensor 45 is connected to an electronic control system 39 of the spreader 10, which may in turn be connected to the control system of any truck or crane carrying the spreader. Thereby, the control systems may be provided with an electronic landing indication indicating whether the transversally outer portion of the abutment face 90 abuts the upper surface 27 of a lifting casting 20. The second loop leg 98*b* is a simple stub, serving for preventing the indicator body 92 from turning about the first loop leg 98*a*. The electronic landing signal, or the absence of an electronic landing signal, may be used for allowing or prohibiting the operation of the twist-locks. Alternatively, the electronic landing signal may be indicated to an operator, such as a reach stacker driver. FIG. 18 illustrates the second hydraulic cylinder 35 (FIG. 1), for operating the second travelling beam 32 (FIG. 2*b*), in greater detail. The hydraulic cylinder 35 is incorporated in a hydraulic cylinder assembly 1001, and has a first end 1003 attached to a top face of the main beam 24 (FIG. 1), and a second end 1005 attached to a top face of the second twist-lock arrangement 44 (FIG. 2*b*) at the distal end 40 of the second travelling beam 32. The hydraulic cylinder assembly 1001 comprises a hydraulic connection assembly 1007 comprising a plurality of hydraulic hoses 1009. In the illustrated example, the hydraulic connection assembly 1007 comprises seven hydraulic hoses 1009*a-g*, two of which 1009*a-b* are hydraulically connected to the hydraulic cylinder 35 adjacent to the respective ends 1003, 1005, to control the hydraulic cylinder 35 in both directions. The remaining five hydraulic hoses 1009*c-g* are configured to forward respective hydraulic control signals to hydraulic actuators other than the hydraulic cylinder 35, such as the first hydraulic cylinder 29 (FIG. 1), any hydraulic cylinders (not shown) for moving the twist-locks 18 between standard position mode (FIG. 7) and wide twist-lock position mode (FIG. 8), and hydraulic actuators for turning the insert end portions 89 of the twist-locks 18 (FIG. 13). In this respect, the hydraulic cylinder 35 doubles as a carrier for hydraulic connections 1009*c-g* unrelated to the function of the hydraulic cylinder 35.

The hydraulic control connection assembly 1007 is attached to the hydraulic cylinder 35 at a plurality of attachment positions 1011 distributed along the length of the hydraulic cylinder 35, such that the hydraulic hoses 1009 require no or very few attachment points directly onto the main beam 24 (FIG. 1).

Thanks to the modular design of the hydraulic cylinder assembly 1001 with the hydraulic connection assembly 1007, the hydraulic cylinder assembly 1001 can be assembled before attaching it to the main frame 12 (FIG. 1). This saves valuable time for assembling the spreader 10 (FIG. 10), as well as substantially reduces the amount of threaded attachment holes needed in the main beam 24 (FIG. 1).

FIGS. 19*a-e* illustrate an alternative embodiment of a transversal beam 346, which may replace any of the transversal beams 46, 48 of the spreader 10 (FIG. 1). Similar to the transversal beam 46, the transversal beam 346 interconnects a pair of twist-locks 18*a-b*. For reasons of clarity of illustration, the transversal beam 346 is illustrated as non-telescopic, even though the transversal beam structure described hereinbelow may equally well be applied to a telescopic transversal beam such as the beam 46 described hereinbefore. The male locking inserts 19 (FIG. 13) of the twist-locks are, also for reasons of clarity of illustration, not illustrated in FIGS. 19*a-f*. The transversal beam 346 is connected to a longitudinal beam 330, which may be telescopically or fixedly attached to the main frame of the spreader 10 (FIG. 1). The transversal beam 346 comprises an outer side wall 2001, an inner side wall 2003, a bottom wall 2005, and a top wall 2007, which are welded together to define a hollow structural section, HSS, structure extending in the transversal direction T. The HSS structure has a cross-section which varies along the length of the transversal beam 346 in the transversal direction T in such a manner that its vertical height $H_T$ decreases towards the ends of the transversal beam 346. Assuming a total length $L_T$ of the transversal beam, the transversal beam portions exhibiting a gradual height decrease extend in each direction to respective positions P located about $1/10 * L_T$ from the transversal beam's 346 ends. The gradually decreasing height $H_T$ is defined by respective inclined upper edges 2013, 2015 of the outer and inner side walls 2001, 2003. The upper edges 2015, 2013 of the inner and outer side walls 2003, 2001 are interconnected by an upper top wall 2007 extending along the length of the upper edges 2013, 2015.

The longitudinal beam 330 penetrates through the inner side wall 2003 and into abutment with the outer side wall 2001, and is attached to both side walls 2001, 2003 by means of respective welds extending about the circumference of the longitudinal beam 330. An inner edge 2009 of the bottom wall 2005 extends inwards, beyond the inner side wall, to define an inwardly extending flange 2011. The flange 2011 has a width $W_F$, in the longitudinal direction, which gradually increases towards the location where the longitudinal beam 330 interfaces the transversal beam 346, and is welded to the longitudinal beam 330 via a pair of supports 2017.

Each of the inner and outer side walls 2001, 2003 has a respective upper wall portion 2001*a*, 2003*a* which is inclined longitudinally inwards, so as to form an acute angle α with a plane defined by the four twist-locks 18 (FIG. 1). The inclined upper wall portions 2001*a*, 2003*a* are parallel to each other, and their top edges 2013, 2015 substantially coincide with each other as seen along the longitudinal direction L of the spreader 10. Each of the inner and outer side walls 2001, 2003 also has a respective lower wall portion 2001*b*, 2003*b* which extends along a respective substantially vertical plane, so as to form an obtuse angle β with the respective upper side wall 2001*a*, 2003*a*. Also the lower wall portions 2001*b*, 2003*b* are parallel to each other. As is evident from FIGS. 19*a-b*, the longitudinal beam 330 engages with, and is welded to, upper and lower wall portions 2001*a-b*, 2003*a-b* of both side walls 2001, 2003, resulting in a very rigid structure.

The present disclosure describes several different inventive concepts, each of which may be implemented independently of, or in combination with, the others. Each separate inventive concept described herein may also form the basis of a divisional application.

The concepts herein have mainly been described above with reference to a few embodiments. However, as is readily appreciated by a person skilled in the art, other embodiments than the ones disclosed above are equally possible within the scope of the invention, as defined by the appended patent claims.

For example, the present disclosure describes a spreader comprising only one single main beam. The teachings provided herein may be applied to other types of spreaders, such as spreaders of the type having a pair of parallel main beams spaced from each other, each main beam holding one single twist-lock at each end.

The first landing indicator 91 has been described as an electronic landing indicator, connected to an electronic control system, whereas the second landing indicator has been described as a purely mechanical arrangement, indicating by blocking/unblocking the motion of the male locking insert end portion 89. Clearly, either of the landing indicators could be of electronic type, of a mechanically blocking type, or both. Landing indicators need not involve any movable parts; instead, the presence of a lifting casting top surface can be detected by e.g. resistive, capacitive, or inductive sensors. In fact, an indication of whether the spreader is set in WTP mode, when lowered onto respective lifting castings having top openings separated according to the ISO standard, can even be performed well before landing, using e.g. a camera mounted to the spreader, and digital image processing determining the distance between the lifting casting top openings.

The invention claimed is:

1. A top-lift spreader for lifting an intermodal transport container, the top-lift spreader comprising:

a main beam that is hollow and defines a first travelling beam guide and a second travelling beam guide parallel to said first travelling beam guide, a first pair of twist-locks and a second pair of twist-locks, said first and second pairs of twist-locks being arranged in a rectangular pattern, a long side of which defines a longitudinal direction and a short side of which defines a transversal direction, the twist-locks being configured to engage with lifting castings arranged in a mating rectangular pattern on a top face of the container, wherein said first pair of twist-locks are interconnected by a transversal beam carried by a longitudinal beam, said longitudinal beam being guided by one of said first or second travelling beam guides, said transversal beam comprising an inner side wall, facing towards the center of the spreader, and an outer side wall, facing away from the center of the spreader, wherein the inner and outer side walls are separated in the longitudinal direction, the longitudinal beam extending through the inner side wall and into contact with the outer side wall, and wherein the longitudinal beam is welded to each of said inner and outer side walls.

2. The top-lift spreader according to claim 1, wherein the transversal beam further comprises a bottom wall having an inner edge extending beyond the inner side wall, to define a flange extending inwards along said longitudinal direction.

3. The top-lift spreader according to claim 1, wherein each of said inner and outer side walls has a respective upper wall portion which is inclined inwards, towards the center of the spreader, so as to form an acute angle with a plane defined by said first and second pairs of twist-locks.

4. The top-lift spreader according to claim 3, wherein each of said inner and outer side walls has a respective lower wall portion which forms an obtuse angle with the respective upper wall portion.

5. The top-lift spreader according to claim 1, wherein the transversal beam has a vertical height which gradually decreases from the transversal beam's interface with the longitudinal beam towards the respective ends of the transversal beam.

6. A top-lift spreader for lifting an intermodal transport container, the top-lift spreader comprising:

a first pair of twist-locks and a second pair of twist-locks, said first and second pairs of twist-locks being arranged in a rectangular pattern, a long side of which defines a longitudinal direction and a short side of which defines a transversal direction, the twist-locks being configured to engage with lifting castings arranged in a mating rectangular pattern on a top face of the container, wherein said first pair of twist-locks are interconnected by a transversal beam carried by a longitudinal beam, said transversal beam comprising an inner side wall, facing towards the center of the spreader, and an outer side wall, facing away from the center of the spreader, wherein the inner and outer side walls are separated in the longitudinal direction, the longitudinal beam extending through the inner side wall and into contact with the outer side wall, wherein each of said inner and outer side walls has a respective upper wall portion which is inclined inwards, towards the center of the spreader, so as to form an acute angle with a plane defined by said first and second pairs of twist-locks, and wherein each of said inner and outer side walls has a respective lower wall portion which forms an obtuse angle with the respective upper wall portion, and wherein the longitudinal beam is welded to each of said inner and outer side walls.

7. The top-lift spreader according to claim 6, wherein the transversal beam further comprises a bottom wall having an inner edge extending beyond the inner side wall, to define a flange extending inwards along said longitudinal direction.

8. The top-lift spreader according to claim 6, wherein the transversal beam has a vertical height which gradually decreases from the transversal beam's interface with the longitudinal beam towards the respective ends of the transversal beam.

* * * * *